US012764595B2

(12) United States Patent
Parichehrehteroujeni et al.

(10) Patent No.: US 12,764,595 B2
(45) Date of Patent: Oct. 13, 2026

(54) METHODS, APPARATUS AND MACHINE-READABLE MEDIA RELATED TO STORAGE OF QoE DATA

(71) Applicant: Telefonaktiebolaget LM Ericsson (publ), Stockholm (SE)

(72) Inventors: Ali Parichehrehteroujeni, Linköping (SE); Cecilia Eklöf, Täby (SE); Filip Barac, Huddinge (SE); Luca Lunardi, Genoa (IT); Johan Rune, Lidingö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 464 days.

(21) Appl. No.: 18/260,632

(22) PCT Filed: Jan. 7, 2022

(86) PCT No.: PCT/SE2022/050006

§ 371 (c)(1),
(2) Date: Jul. 7, 2023

(87) PCT Pub. No.: WO2022/154713

PCT Pub. Date: Jul. 21, 2022

(65) Prior Publication Data

US 2024/0056872 A1 Feb. 15, 2024

Related U.S. Application Data

(60) Provisional application No. 63/137,404, filed on Jan. 14, 2021.

(51) Int. Cl.
*H04W 28/02* (2009.01)
*H04L 41/0803* (2022.01)
(Continued)

(52) U.S. Cl.
CPC ..... *H04W 28/0268* (2013.01); *H04L 41/0803* (2013.01); *H04L 41/0806* (2013.01);
(Continued)

(58) Field of Classification Search
CPC ... H04W 28/0268; H04W 8/24; H04W 24/08; H04W 28/0215; H04W 28/0236;
(Continued)

(56) References Cited

U.S. PATENT DOCUMENTS 11,122,551 B2 * 9/2021 Kwon .................... H04W 72/23
2015/0094876 A1 * 4/2015 Baldwin ................. H04W 4/80 701/1

(Continued)

FOREIGN PATENT DOCUMENTS

EP 2604064 A2 6/2013
EP 2955956 A1 12/2015

(Continued)

OTHER PUBLICATIONS

Mendoza et al., "On the Capability of QoE Improvement Based on the Adjustment of RLC Parameters", Sensor, Apr. 27, 2020. (Year: 2020).*

(Continued)

*Primary Examiner* — Brian J. Gillis
*Assistant Examiner* — Chhian (Amy) Ling
(74) *Attorney, Agent, or Firm* — Murphy, Bilak & Homiller, PLLC

(57) ABSTRACT

A method is performed by a wireless device for handling quality-of-experience, QoE, data, wherein the wireless device comprises a storage medium. The method comprises: receiving, from a base station, a request to perform one or more QoE measurements according to a QoE measurement configuration; initiating one or more QoE measurements according to the QoE measurement configuration; and stor- (Continued)

ing results of the one or more QoE measurements in a storage portion of the storage medium allocated for the storage of QoE measurements. The storage portion has a configured maximum size.

23 Claims, 20 Drawing Sheets

(51) Int. Cl.

| | |
|---|---|
| ***H04L 41/0806*** | (2022.01) |
| ***H04L 41/0853*** | (2022.01) |
| ***H04L 41/0895*** | (2022.01) |
| ***H04L 41/40*** | (2022.01) |
| ***H04L 41/5067*** | (2022.01) |
| ***H04W 8/24*** | (2009.01) |
| ***H04W 24/08*** | (2009.01) |
| *H04L 43/06* | (2022.01) |
| *H04L 43/08* | (2022.01) |

(52) U.S. Cl.

CPC ...... *H04L 41/0853* (2013.01); *H04L 41/0895* (2022.05); *H04L 41/40* (2022.05); *H04L 41/5067* (2013.01); *H04W 8/24* (2013.01); *H04W 24/08* (2013.01); *H04W 28/0215* (2013.01); *H04W 28/0236* (2013.01); *H04L 43/06* (2013.01); *H04L 43/08* (2013.01)

(58) Field of Classification Search

CPC ............. H04L 41/0803; H04L 41/0806; H04L 41/0853; H04L 41/0895; H04L 41/40; H04L 41/5067; H04L 43/06; H04L 43/08

See application file for complete search history.

(56) References Cited

U.S. PATENT DOCUMENTS

| | | | | |
|---|---|---|---|---|
| 2016/0212595 | A1 | 7/2016 | Fukuta et al. | |
| 2017/0013499 | A1* | 1/2017 | Chen | H04W 72/51 |
| 2018/0035438 | A1 | 2/2018 | Pao et al. | |
| 2020/0154267 | A1* | 5/2020 | Soriaga | H04W 8/24 |
| 2021/0083743 | A1* | 3/2021 | Faxér | H04B 7/0632 |
| 2021/0235465 | A1* | 7/2021 | Meylan | H04W 72/12 |
| 2021/0320879 | A1* | 10/2021 | Wang | H04L 47/32 |
| 2021/0392548 | A1* | 12/2021 | Mallikarjunan | H04W 28/0257 |
| 2022/0046503 | A1* | 2/2022 | Kumar | H04W 28/24 |

FOREIGN PATENT DOCUMENTS

| | | | |
|---|---|---|---|
| JP | 2017153086 | A | 8/2017 |
| WO | 2018142345 | A1 | 8/2018 |
| WO | 2020164082 | A1 | 8/2020 |
| WO | 2020197484 | A1 | 10/2020 |

OTHER PUBLICATIONS

"3GPP TS 26.114 V16.8.0", 3rd Generation Partnership Project; Technical Specification Group Services and System Aspects; IP Multimedia Subsystem (IMS); Multimedia Telephony; Media handling and interaction (Release 16), Dec. 2020, pp. 1-445.

"3GPP TS 33.210 V16.4.0", 3rd Generation Partnership Project; Technical Specification Group Services and System Aspects;Network Domain Security (NDS); IP network layer security (Release 16), Jul. 2020, pp. 1-27.

"3GPP TS 33.501 V17.0.0", 3rd Generation Partnership Project; Technical Specification Group Services and System Aspects; Security architecture and procedures for 5G system (Release 17), Dec. 2020, pp. 1-253.

"3GPP TS 38.300 V16.4.0", 3rd Generation Partnership Project; Technical Specification Group Radio Access Network; NR; NR and NG-RAN Overall Description; Stage 2 (Release 16), Dec. 2020, pp. 1-149.

"3GPP TS 38.306 V16.2.0", 3rd Generation Partnership Project; Technical Specification Group Radio Access Network; NR; User Equipment (UE) radio access capabilities (Release 16), Sep. 2020, pp. 1-126.

"Clarification of UE capability for QoE Measurement Collection for streaming services", 3GPP TSG-RAN2 Meeting #98, R2-1704740, Hangzhou, China, May 15-19, 2017, pp. 1-4.

"LS Reply on QoE Measurement Collection", 3GPP TSG-SA4 Meeting #109-e, S4-200962, Online, May 20-Jun. 3, 2019, pp. 1-2.

"NR QoE Measurement Triggering, Configuration, Collection and Reporting", 3GPP TSG-RAN WG2 Meeting #109-e, R2-2007600, Electronic meeting, Aug. 17-28, 2020, pp. 1-5.

"3GPP TS 36.331 V16.3.0", 3rd Generation Partnership Project; Technical Specification Group Radio Access Network; Evolved Universal Terrestrial Radio Access (E-UTRA); Radio Resource Control (RRC); Protocol specification (Release 16), Dec. 2020, pp. 1-1084.

"3GPP TS 38.423 V16.4.0", 3rd Generation Partnership Project; Technical Specification Group Radio Access Network; NG-RAN; Xn application protocol (XnAP) (Release 16), Jan. 2021, pp. 1-457.

"3GPP TS 38.331 V16.3.1", 3rd Generation Partnership Project; Technical Specification Group Radio Access Network; NR; Radio Resource Control (RRC) protocol specification (Release 16), Jan. 2021, pp. 1-932.

"3GPP TS 25.331 V16.1.0", 3rd Generation Partnership Project; Technical Specification Group Radio Access Network; Radio Resource Control (RRC); Protocol specification (Release 16), Sep. 2020, pp. 1-2319.

"3GPP TS 23.501 V16.7.0", 3rd Generation Partnership Project; Technical Specification Group Services and System Aspects; System architecture for the 5G System (5GS); Stage 2 (Release 16), Dec. 2020, pp. 1-450.

"3GPP TS 28.405 V16.0.0", 3rd Generation Partnership Project; Technical Specification Group Services and System Aspects; Telecommunication management; Quality of Experience (QoE) measurement collection; Control and configuration (Release 16), Jul. 2020, pp. 1-16.

"3GPP TS 26.247 V16.4.1", 3rd Generation Partnership Project; Technical Specification Group Services and System Aspects; Transparent end-to-end Packet-switched Streaming Service (PSS); Progressive Download and Dynamic Adaptive Streaming over HTTP (3GP-DASH) (Release 16), Oct. 2020, pp. 1-140.

Ericsson, "Clarification of UE capability for QoE Measurement Collection for streaming services", 3GPP TSG-RAN2 Meeting #97bis; R2-1703216; Spokane, US, Apr. 3-7, 2017, 4 pages.

* cited by examiner

METHODS, APPARATUS AND MACHINE-READABLE MEDIA RELATED TO STORAGE OF QoE DATA

TECHNICAL FIELD

Embodiments of the present disclosure relate to wireless communication, and particularly to methods, apparatus and machine-readable media related to storage of QoE data.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Overall Architecture of NG-RAN

The NG-RAN 102 consists of a set of gNBs 104 connected to the 5GC 106 through the NG interface.

NOTE: As specified in 38.300 v 16.4.0, NG-RAN could also consist of a set of ng-eNBs, an ng-eNB may consist of an ng-eNB-CU and one or more ng-eNB-DU(s). An ng-eNB-CU and an ng-eNB-DU is connected via W1 interface. The general principle described in this section also applies to ng-eNB and W1 interface, if not explicitly specified otherwise.

An gNB can support FDD mode, TDD mode or dual mode operation.

gNBs can be interconnected through the Xn interface.

A gNB 104 may consist of a gNB-CU 108 and one or more gNB-DU(s) 110. A gNB-CU 108 and a gNB-DU 110 is connected via F1 interface.

One gNB-DU is connected to only one gNB-CU.

NOTE: In case of network sharing with multiple cell ID broadcast, each Cell Identity associated with a subset of PLMNs corresponds to a gNB-DU and the gNB-CU it is connected to, i.e. the corresponding gNB-DUs share the same physical layer cell resources.

NOTE: For resiliency, a gNB-DU may be connected to multiple gNB-CUs by appropriate implementation.

NG, Xn and F1 are logical interfaces.

For NG-RAN, the NG and Xn-C interfaces for a gNB consisting of a gNB-CU and gNB-DUs, terminate in the gNB-CU. For EN-DC, the S1-U and X2-C interfaces for a gNB consisting of a gNB-CU and gNB-DUs, terminate in the gNB-CU. The gNB-CU and connected gNB-DUs are only visible to other gNBs and the 5GC as a gNB. A possible deployment scenario is described in Annex A.

The node hosting user plane part of NR PDCP (e.g. gNB-CU, gNB-CU-UP, and for EN-DC, MeN6 or SgNB depending on the bearer split) shall perform user inactivity monitoring and further informs its inactivity or (re)activation to the node having C-plane connection towards the core network (e.g. over E1, X2). The node hosting NR RLC (e.g. gNB-DU) may perform user inactivity monitoring and further inform its inactivity or (re)activation to the node hosting control plane, e.g. gNB-CU or gNB-CU-CP.

UL PDCP configuration (i.e. how the UE uses the UL at the assisting node) is indicated via X2-C (for EN-DC), Xn-C (for NG-RAN) and F1-C. Radio Link Outage/Resume for DL and/or UL is indicated via X2-U (for EN-DC), Xn-U (for NG-RAN) and F1-U.

The NG-RAN is layered into a Radio Network Layer (RNL) and a Transport Network Layer (TNL).

The NG-RAN architecture, i.e. the NG-RAN logical nodes and interfaces between them, is defined as part of the RNL.

For each NG-RAN interface (NG, Xn, F1) the related TNL protocol and the functionality are specified. The TNL provides services for user plane transport, signalling transport.

In NG-Flex configuration, each NG-RAN node is connected to all AMFs of AMF Sets within an AMF Region supporting at least one slice also supported by the NG-RAN node. The AMF Set and the AMF Region are defined in 3GPP TS 23.501 v 16.7.0.

If security protection for control plane and user plane data on TNL of NG-RAN interfaces has to be supported, NDS/IP 3GPP TS 33.501 v 17.0.0 shall be applied.

Overall Architecture for Separation of QNB-CU-CP and gNB-CU-UP

The overall architecture for separation of gNB-CU-CP and gNB-CU-UP is depicted in FIG. 2.

A gNB may consist of a gNB-CU-CP, multiple gNB-CU-UPs and multiple gNB-DUs;

The gNB-CU-CP is connected to the gNB-DU through the F1-C interface;

The gNB-CU-UP is connected to the gNB-DU through the F1-U interface;

The gNB-CU-UP is connected to the gNB-CU-CP through the E1 interface;

One gNB-DU is connected to only one gNB-CU-CP;

One gNB-CU-UP is connected to only one gNB-CU-CP;

NOTE 1: For resiliency, a gNB-DU and/or a gNB-CU-UP may be connected to multiple gNB-CU-CPs by appropriate implementation.

One gNB-DU can be connected to multiple gNB-CU-UPs under the control of the same gNB-CU-CP;

One gNB-CU-UP can be connected to multiple DUs under the control of the same gNB-CU-CP;

NOTE 2: The connectivity between a gNB-CU-UP and a gNB-DU is established by the gNB-CU-CP using Bearer Context Management functions.

NOTE 3: The gNB-CU-CP selects the appropriate gNB-CU-UP(s) for the requested services for the UE. In case of multiple CU-UPs they belong to same security domain as defined in TS 33.210 v 16.4.0.

NOTE 4: Data forwarding between gNB-CU-UPs during intra-gNB-CU-CP handover within a gNB may be supported by Xn-U.

QoE Measurements in Legacy Solution

Quality of Experience (QoE) measurements have been specified for LTE and UMTS. The purpose of the application layer measurements is to measure the end user experience when using certain applications. Currently QoE measurements for streaming services and for MTSI (Mobility Telephony Service for IMS) services are supported.

The solutions in LTE and UMTS are similar with the overall principles as follows. Quality of Experience Measurement Collection enables configuration of application layer measurements in the UE and transmission of QoE measurement result files by means of RRC signalling. Application layer measurement configuration received from OAM or CN is encapsulated in a transparent container, which is forwarded to UE in a downlink RRC message. Application layer measurements received from UE's higher layer are encapsulated in a transparent container and sent to network in an uplink RRC message. The result container is then forwarded to a TCE, Trace Collector Entity.

In 3GPP release 17 a new study item for "Study on NR QoE management and optimizations for diverse services" for NR has been approved. The purpose of the study item is to study solutions for QoE measurements in NR. QoE management in NR will not just collect the experience parameters of streaming services but also consider the typical performance requirements of diverse services (e.g. AR/VR and URLLC). Based on requirements of services, the NR study will also include more adaptive QoE management schemes that enable network intelligent optimization to satisfy user experience for diverse services.

The measurements may be initiated towards RAN in management-based manner, i.e. from an O&M node in a generic way e.g. for a group of UEs, or they may also be initiated in a signaling-based manner, i.e. initiated from CN to RAN e.g. for a single UE. The configuration of the measurement includes the measurement details, which is encapsulated in a container that is transparent to RAN.

When initiated via the core network, the measurement is started towards a specific UE. For the LTE case, the "TRACE START" S1AP message is used, which carries, among others, the details about the measurement configuration the application should collect (in the "Container for application layer measurement configuration" IF, transparent to the RAN) and the details to reach the trace collection entity to which the measurements should be sent.

RAN is not aware of when the streaming session is ongoing in the UE Access Stratum is also not aware of when the measurements are ongoing. It is an implementation decision when RAN stops the measurements. Typically, it is done when the UE has moved outside the measured area.

One opportunity provided by legacy solution is also to be able to keep the QoE measurement for the whole session, even during handover situation.

QoE measurement in UTRAN

UTRAN—Application Layer Measurement Capabilities

According to 3GPP TS 25.331 v 16.1.0, UTRAN can request the UE (via "UE Capability Enquiry") to report its capability, as shown in Error! Reference source not found. 3.

The UE can provide its capability using the "UE Capability Information" RRC message as shown in FIG. 4.

The "UE Capability Information" message can include the "UE radio access capability" (see excerpt below from 3GPP TS 25.331 v 16.1.0).

| Information Element/Group name | Need | Multi | Type and reference | Semantics description | Version |
|---|---|---|---|---|---|
| Measurement capability | OP | | Measurement capability 10.3.3.21 | | |

The "Measurement Capability" IE can be used from the UE to transfer to the UTRAN the information related to the capability to perform the QoE measurement collection for streaming services and/or MTSI services. Below an extract of the "Measurement Capability" from 3GPP TS 25.331 v 16.1.0.

| Information Element/Group name | Need | Multi | Type and reference | Semantics description | Version |
|---|---|---|---|---|---|
| QoE Measurement Collection for streaming services | CV-not_iRAT_HoInfo | | Enumerated (TRUE) | TRUE means that the UE supports QoE Measurement Collection for streaming services. | REL-14 |
| QoE Measurement Collection for MTSI services | CV-not_iRAT_HoInfo | | Enumerated (TRUE) | TRUE means that the UE supports QoE Measurement Collection for MTSI services. | REL-15 |

UTRAN—QoE Measurement Configuration—RRC Signaling

To configure QoE measurement in the UE, the UTRAN can send a "Measurement Control" RRC message containing "Application layer measurement configuration".

The content of the "Application layer measurement configuration" IE is represented in the table below.

| Information Element/Group name | Need | Multi | Type and reference | Semantics description | Version |
|---|---|---|---|---|---|
| Container for application layer measurement configuration | MP | | Octet string (1 . . . 1000) | | REL-14 |
| Service type | MP | | Enumerated (QoEStreaming, QoEMTSI) | | REL-15 |

UTRAN—QoE Measurement Reporting—RRC Signaling

The UE can send QoE measurement results via UTRAN to the Collecting Entity using the "Measurement Report" RRC message and including the "Application layer measurement reporting" IE.

The UE may also perform Cell Update with cause "application layer measurement report available" in order to initiate the transfer of application layer measurement report.

Signalling radio bearer RB4 shall be used for the MEASUREMENT REPORT message carrying the IE "Application layer measurement reporting".

The content of the "Application layer measurement reporting" IE is represented in the table below.

| Information Element/Group name | Need | Multi | Type and reference | Semantics description | Version |
|---|---|---|---|---|---|
| Container for application layer measurement reporting | MP | | Octet string (1 . . . 8000) | | REL-14 |
| Service type | MP | | Enumerated (QoEStreaming, QoEMTSI) | | REL-15 |

QoE Measurement in E-UTRAN

E-UTRAN—Application Layer Measurement Capabilities

For E-UTRAN, the UE capability transfer is used to transfer UE radio access capability information from the UE to E-UTRAN.

The UE-EUTRA-Capability IE is used to convey the E-UTRA UE Radio Access Capability Parameters and the Feature Group Indicators for mandatory features to the network.

In the response message "UECapabilityInformation", the UE can include the "UE-EUTRA-Capability" IE. The "UE-EUTRA-Capability" IE may include the UE-EUTRA-Capability-v1530-IE which can be used by the UE to indicate whether the UE supports or not QoE Measurement Collection for streaming services and/or MTSI services, as detailed in the "MeasParameters-v1530" enconding below.

A UE capable of application layer measurement reporting in RRC_CONNECTED may initiate the procedure when configured with application layer measurement, i.e. when measConfigAppLayer has been configured by E-UTRAN.

Upon initiating the procedure, the UE shall:

1> if configured with application layer measurement, and SRB4 is configured, and the UE has received application layer measurement report information from upper layers:

2> set the measReportAppLayerContainer in the MeasReportAppLayer message to the value of the application layer measurement report information;

2> set the serviceType in the MeasReportAppLayer message to the type of the application layer measurement report information;

2> submit the MeasReportAppLayer message to lower layers for transmission via SRB4.

E-UTRAN—QoE Measurement Configuration Setup and Release—RRC Signaling

The RRCConnectionReconfiguration message is used to reconfigure the UE to setup or release the UE for Application Layer measurements. This is signaled in the measConfigAppLayer-15 IE within the "OtherConfig" IE.

The setup includes the transparent container measConfigAppLayerContainer which specifies the QoE measurement configuration for the Application of interest and the service-

```
MeasParameters-v1530 ::=            SEQUENCE {
    qoe-MeasReport-r15              ENUMERATED {supported}    OPTIONAL,
    qoe-MTSI-MeasReport-r15         ENUMERATED {supported}    OPTIONAL,
    ca-IdleModeMeasurements-r15     ENUMERATED {supported}    OPTIONAL,
    ca-IdleModeValidityArea-r15     ENUMERATED {supported}    OPTIONAL,
    heightMeas-r15                  ENUMERATED {supported}    OPTIONAL,
    multipleCellsMeasExtension-r15  ENUMERATED {supported}    OPTIONAL
}
```

| qoe-MeasReport |
|---|
| indicate whether the UE supports QoeMeasurement Collection for streaming services |
| **qoe-MTSI-MeasReport** |
| indicate whether the UE supports QoeMeasurement Collection for MTSI services |

E-UTRAN— Application Layer Measurement Reporting

The purpose of the "Application layer measurement reporting" procedure described in 3GPP TS 36.331 v 16.3.0 and shown below is to inform E-UTRAN about application layer measurement report.

Type IE to indicates the Application (or service) for which the QoE measurements are being configured. Supported services are streaming and MTSI.

The details for the measConfigAppLayer IE are provided below.

```
measConfigAppLayer-r15      CHOICE {
release                 NULL,
setup                       SEQUENCE{
    measConfigAppLayerContainer-r15     OCTET STRING (SIZE(1.. 1000)),
    serviceType-r15                     ENUMERATED {qoe, qoemtsi, spare6,
spare5, spare4, spare3, spare2, spare1}
}
```

| measConfigAppLayerContainer |
|---|
| The field contains configuration of application layer measurements, see Annex L (normative) in TS 26.247 v 16.4.1 and clause 16.5 in TS 26.114 v 16.8.0. |

-continued

| service Type |
|---|
| Indicates the type of application layer measurement. Value qoe indicates Quality of Experience Measurement Collection for streaming services, value qoemtsi indicates Enhanced Quality of Experience Measurement Collection for MTSI. |

E-UTRAN—QoE Measurement Reporting—RRC Signaling

As specified in 3GPP TS 36.331 v 16.3.0, the MeasReportAppLayer RRC message is used by the UE to send to the E-UTRAN node the QoE measurement results of an Application (or service). The service for which the report is being sent is indicated in the "serviceType" IE.

The details for the MeasReportAppLayer message, sent using Signalling Radio Bearer, SRB4, are provided below.

MeasReportAppLayer Message

When the overload situation in RAN is ended the eNB restart the reporting from the UE by send the RRCConnectionReconfiguration message [9] to relevant UEs. The RRCConnectionReconfiguration message is including measConfigAppLayer set to restart application layer measurement reporting in otherConfig [9]. The Access stratum sends +CAPPLEVMC AT command [5] to the application with the restart request. The application restarts the reporting and recording if it was stopped.

```
-- ASN1START
MeasReportAppLayer-r15 ::=            SEQUENCE {
  criticalExtensions                  CHOICE {
    measReportAppLayer-r15                    MeasReportAppLayer-r15-IEs,
    criticalExtensionsFuture          SEQUENCE { }
  }
}
MeasReportAppLayer-r15-IEs ::=        SEQUENCE {
  measReportAppLayerContainer-r15     OCTET STRING (SIZE(1..8000))
OPTIONAL,
  service Type-r15                              ENUMERATED
 {qoe, qoemtsi, spare6, spare5, spare4, spare3, spare2, spare1}          OPTIONAL,
  nonCriticalExtension MeasReportAppLayer-v1590-IEs OPTIONAL
}
MeasReportAppLayer-v1590-IEs ::= SEQUENCE {
  lateNonCriticalExtension          OCTET STRING OPTIONAL,
  nonCriticalExtension              +SEQUENCE {} OPTIONAL
}
-- ASN1STOP
```

| MeasReportAppLayer field descriptions |
|---|
| measReportAppLayerContainer |
| The field contains container of application layer measurements, see Annex L (normative) in TS 26.247 v 16.4.1 and clause 16.5 in TS 26.114 v 16.8.0. |
| service Type |
| Indicates the type of application layer measurement. Value qoe indicates Quality of Experience Measurement Collection for streaming services, value qoemtsi indicates Quality of Experience Measurement Collection for MTSI. |

Handling QoE Measurement Under Overload RAN Conditions

As part of LTE specification 28.405 v 16.0.0, RAN nodes are allowed to temporarily stop and restart the QoE measurement reporting when an overload situation is observed at RAN nodes. Here is an excerpt from 28.405 v 16.0.0:

4.2.4 Temporary Stop and Restart of QoE Information Reporting During RAN Overload in LTE In case of overload in RAN, the eNB may temporarily stop the reporting from the UE by sending the RRCConnectionReconfiguration message [9] to relevant UEs. The RRCConnectionReconfiguration message is including measConfigAppLayer set to temporarily stop application layer measurement reporting in otherConfig [9]. The Access stratum sends +CAPPLEVMC AT command [5] to the application with the temporary stop request. The application stops the reporting and stops recording further information when the data in the reporting container is used. Then the recorded data is kept until it is reported or when the UE request session is ended.

Full Configuration

As part of handover preparation to a target node, the source node sends the current UE configuration to the target node in the HANDOVER REQUEST message, see TS 38.423 v 16.4.0. The target node prepares a target configuration for the UE based on the current configuration and the target node's and the UE's capabilities. The target configuration is sent from the target node in HANDOVER REQUEST ACKNOWLEDGE to the source node and onwards to the UE in RRCReconfiguration. As a streamlined option, the target configuration can be provided as a so called delta-configuration, indicating only the differences from the UE's current configuration in the source cell.

However, if the target node does not recognize something in the UE's current configuration, it is due to that the target node does not support some feature which the source node supports. In such case the target node will trigger a full configuration, meaning that the UE will discard the current configuration and make a new configuration from scratch. This is further described in TS 38.331 v 16.3.1 chapter 5.3.5.11. This will also be application for the case where the target nodes do not support QoE measurements, or does not support QoE measurements of a certain type which the source node supports and which the UE is configured with.

SUMMARY

There currently exist certain challenge(s). The configuration of QoE measurements is done by OAM by specifying the parameters in the configuration file. The parameters define what measurements should be done, how often the reports should be sent etc. OAM defines the configuration based on what kind of measurements it would like to receive and it does not necessarily take into account how large the reports may become. However, for a UE it may become a problem to store very large files as it consumes memory in the UE. The UE behavior for when the maximum size is reached is also unclear and different UEs may behave differently.

Certain aspects of the present disclosure and their embodiments may provide solutions to these or other challenges. The proposed methods in this disclosure enable the definition of a size of the memory/buffer for QoE reports that the UE is required to (or can) store. The size could be hard coded or defined by UE capabilities. It also provides the UE behavior for when the maximum size is reached. The UE may indicate to the network its capability in terms of allocated memory for the QoE measurement reports at its RRC layer.

The memory/buffer size allocated to store the QoE report can be the exact size or it can be the maximum size of memory (in units of kilobytes, megabytes or any other scale).

There are, proposed herein, various embodiments which address one or more of the issues disclosed herein. For example, one embodiment provides a method performed by a wireless device for handling quality-of-experience, QoE, data, wherein the wireless device comprises a storage medium. The method comprises: receiving, from a base station, a request to perform one or more QoE measurements according to a QoE measurement configuration; initiating one or more QoE measurements according to the QoE measurement configuration; and storing results of the one or more QoE measurements in a storage portion of the storage medium allocated for the storage of QoE measurements. The storage portion has a configured maximum size.

Another embodiment provides a method performed by a base station for controlling the handling of quality-of-experience, QoE, data in a wireless device, the wireless device comprising a storage medium having a storage portion allocated for the storage of QoE measurements. The method comprises: receiving, from the wireless device, an indication of a configured maximum size of the storage portion; and transmitting, to the wireless device, a request for the wireless device to perform one or more QoE measurements according to a QoE measurement configuration.

Another embodiment provides a method performed by a base station for controlling the handling of quality-of-experience, QoE, data in a wireless device, the wireless device comprising a storage medium having a storage portion allocated for the storage of QoE measurements. The method comprises: transmitting, to the wireless device, a request for the wireless device to perform one or more QoE measurements according to a QoE measurement configuration; and configuring the wireless device with a configured maximum size of the storage portion.

Further aspects of the disclosure provide apparatus for performing the methods described herein. For example, one aspect provides a wireless device for handling quality-of-experience, QoE, data. The wireless device comprises: a storage medium, processing circuitry and power supply circuitry. The processing circuitry is configured to cause the wireless device to: receive, from a base station, a request to perform one or more QoE measurements according to a QoE measurement configuration; initiate one or more QoE measurements according to the QoE measurement configuration; and store results of the one or more QoE measurements in a storage portion of the storage medium allocated for the storage of QoE measurements. The storage portion has a configured maximum size. The power supply circuitry is configured to supply power to the wireless device.

Another aspect provides a base station for controlling the handling of quality-of-experience, QoE, data in a wireless device. The wireless device comprises a storage medium having a storage portion allocated for the storage of QoE measurements. The base station comprises: processing circuitry and power supply circuitry. The processing circuitry is configured to cause the base station to: receive, from the wireless device, an indication of a configured maximum size of the storage portion; and transmit, to the wireless device, a request for the wireless device to perform one or more QoE measurements according to a QoE measurement configuration. The power supply circuitry is configured to supply power to the base station.

A further aspect provides a base station for controlling the handling of quality-of-experience, QoE, data in a wireless device. The wireless device comprises a storage medium (1221) having a storage portion allocated for the storage of QoE measurements. The base station comprises: processing circuitry and power supply circuitry. The processing circuitry is configured to cause the base station to: transmit, to the wireless device, a request for the wireless device to perform one or more QoE measurements according to a QoE measurement configuration; and configure the wireless device with a configured maximum size of the storage portion. The power supply circuitry is configured to supply power to the base station.

Certain embodiments may provide one or more of the following technical advantage(s). One advantage of the solution is that it ensures that the maximum memory/buffer size for storing the QoE reports at UE RRC layer is defined. By defining a maximum memory/buffer size, the UE behavior is better controlled and different behavior or undefined behavior for different UEs is avoided. A defined maximum memory size also gives OAM some guidelines to the configurations, so that it preferably defines the configuration parameters in such a way that the maximum memory/buffer size is not exceeded. This also has a benefit to RAN, as transmission of reports which are too large is avoided in the network.

A defined behavior for when the maximum size is reached leads to predictable UE behavior and avoids different behaviors or undefined behaviors for different UEs.

BRIEF DESCRIPTION OF DRAWINGS

For a better understanding of examples of the present disclosure, and to show more clearly how the examples may be carried into effect, reference will now be made, by way of example only, to the following drawings in which.

DETAILED DESCRIPTION

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

In the following:

The terms "wireless device", "UE", "terminal equipment" and "wireless terminal" are used interchangeably.

The terms MCE and TCE are used interchangeably.

The terms "network node" and "RAN node" are used interchangeably, where the RAN node can be a gNB, eNB, gNB-CU, gNB-CU-CP, eNB-CU, eNB-CU-CP, IAB-donor, IAB-donor-CU, IAB-donor-CU-CP.

The terms "application layer measurement configuration", "application measurement configuration", "QoE measurement configuration" and "QoE measurement and reporting configuration" are used interchangeably.

The terms "modem", "access stratum", "radio layer", "RRC layer" and "radio network layer" are used interchangeably.

The solution proposed in this disclosure applies to any suitable wireless communication network, such as UMTS, LTE and NR.

All references to the "application layer" are with respect to the application layer of the UE (since RAN nodes do not have an application layer).

The solution proposed in this disclosure applies to both signaling- and management-based MDT and QoE measurements.

The terms "QoE report", "QoE measurement data", and "results of QoE measurements" are often used to refer to the same thing in this document, i.e. referring to data collected through QoE measurements that is stored in the UE waiting to be reported to the network.

The term "Lightweight QoE report" refers to the concept, where, instead of reporting the legacy, full-fledged, measured QoE metric values, a generic/simplified QoE score (e.g. a numeric value on a scale from 0 to X) is reported to the network. It is possible to provide a single value for the entire QoE lightweight report or several values, where each of the values is derived from one legacy QoE metric (e.g. instead of reporting that jitter is 1 ms (where it may be assumed that this is very good value), a unitless value of 9 on a scale from 0 to 10 is reported for jitter).

Figure 1:
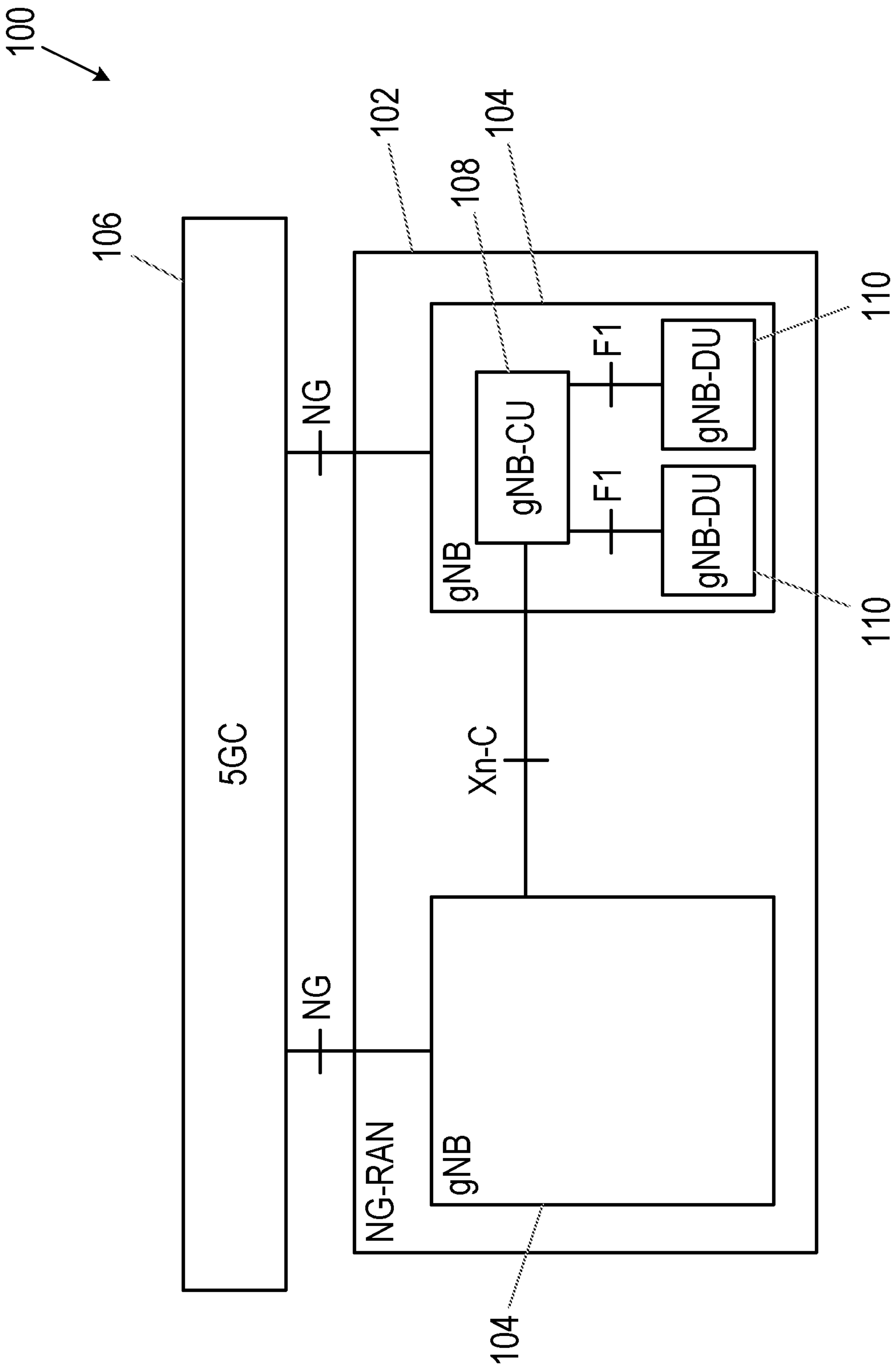
FIG. 1 is a schematic diagram illustrating the overall architecture of an NG-RAN.
Figure 2:
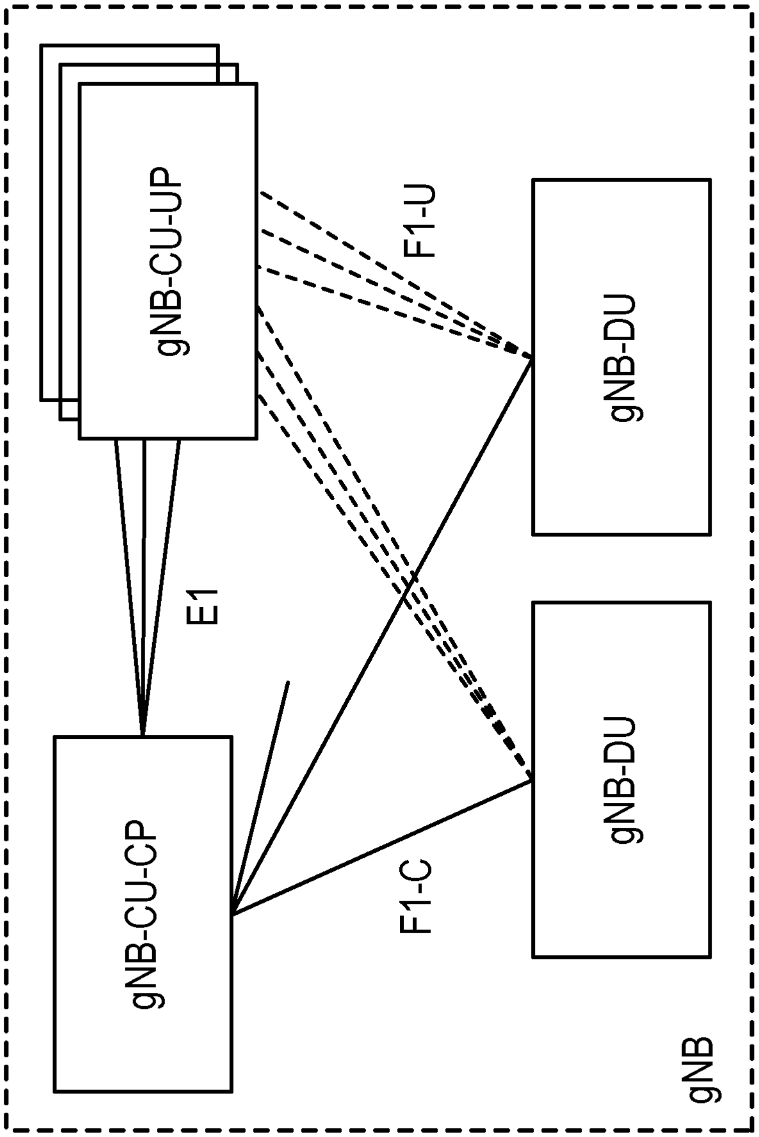
FIG. 2 is a schematic diagram illustrating the overall architecture for separation of gNB-CU-CP and gNB-CU-UP.
Figure 3:
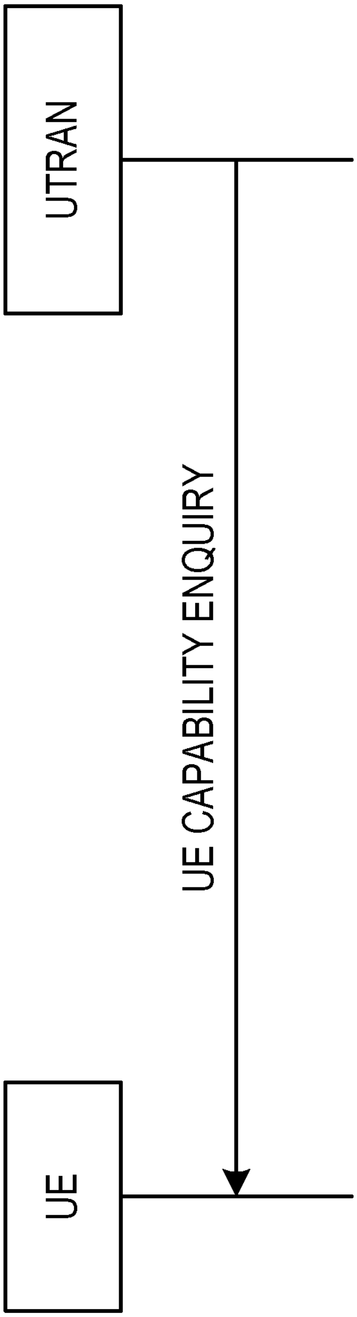
FIG. 3 is a signalling flow diagram for a UE capability enquiry procedure using UTRAN.
Figure 4:
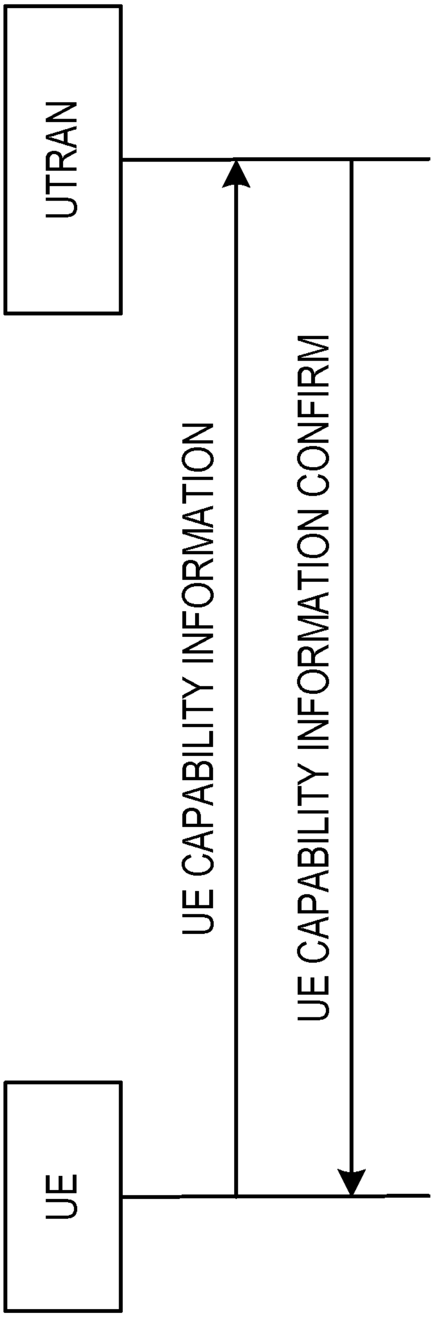
FIG. 4 is a signalling flow diagram for the transmission of UE capability information using UTRAN.
Figure 5:
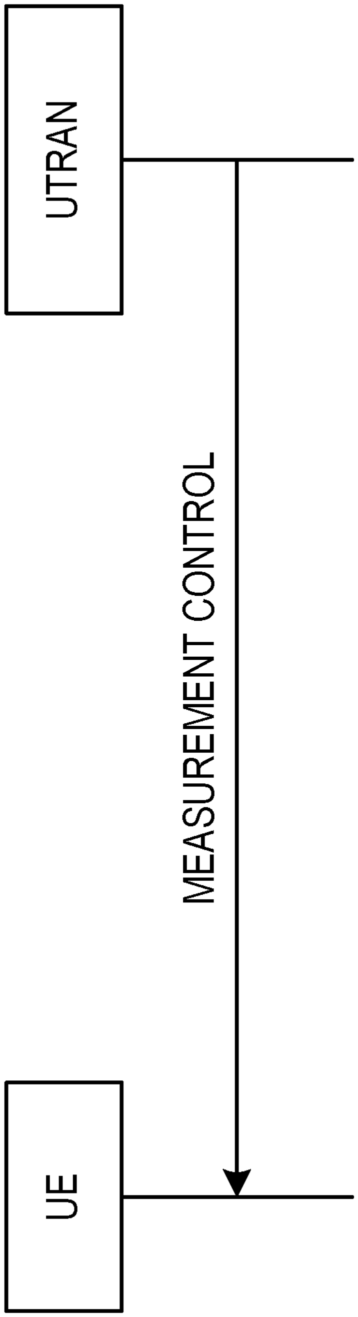
FIG. 5 is a signalling flow diagram for QoE measurement configuration using UTRAN.
Figure 6:
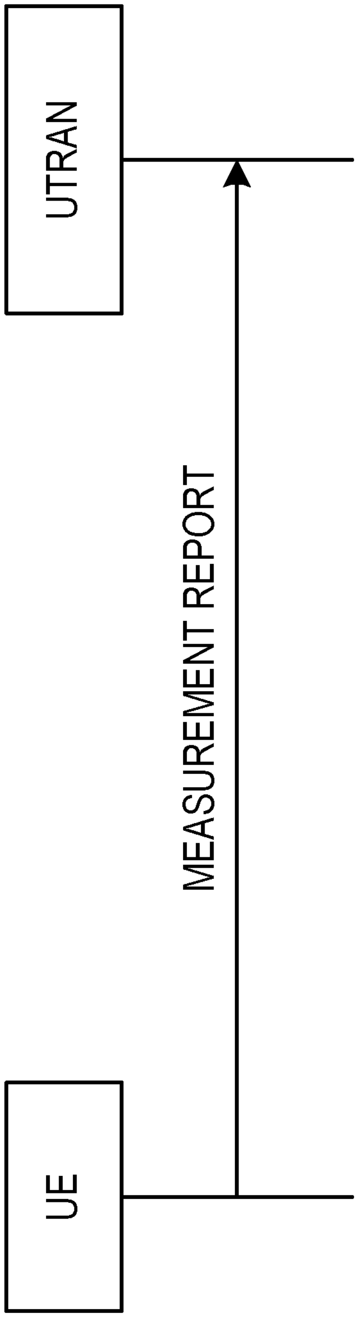
FIG. 6 is a signalling flow diagram for a QoE measurement report procedure using UTRAN.
Figure 7:
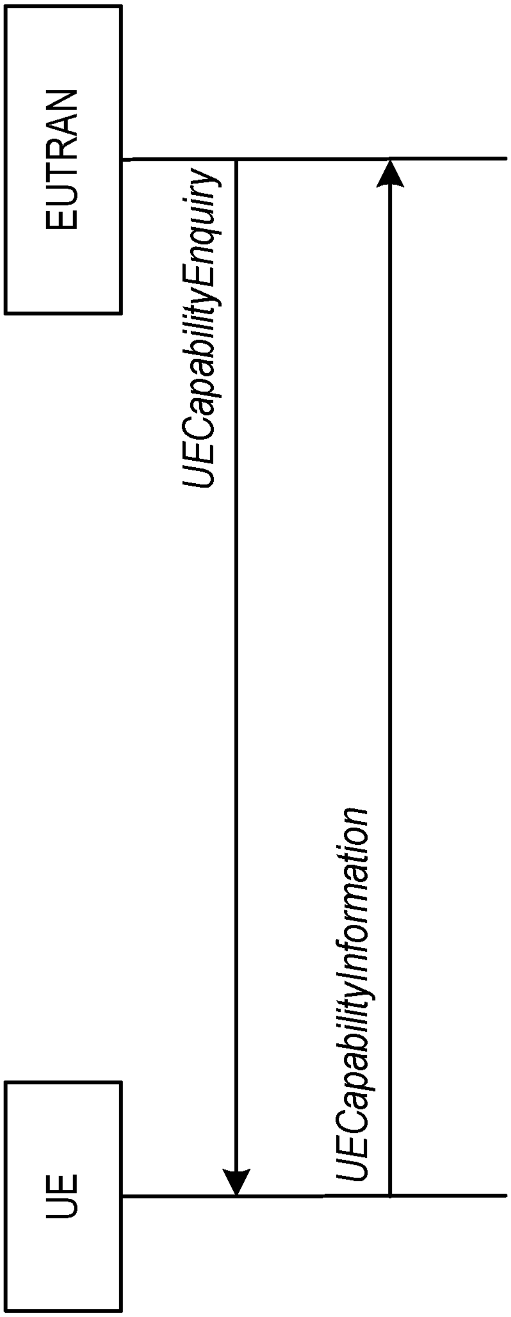
FIG. 7 is a signalling flow diagram for UE capability transfer using E-UTRAN.
Figure 8:
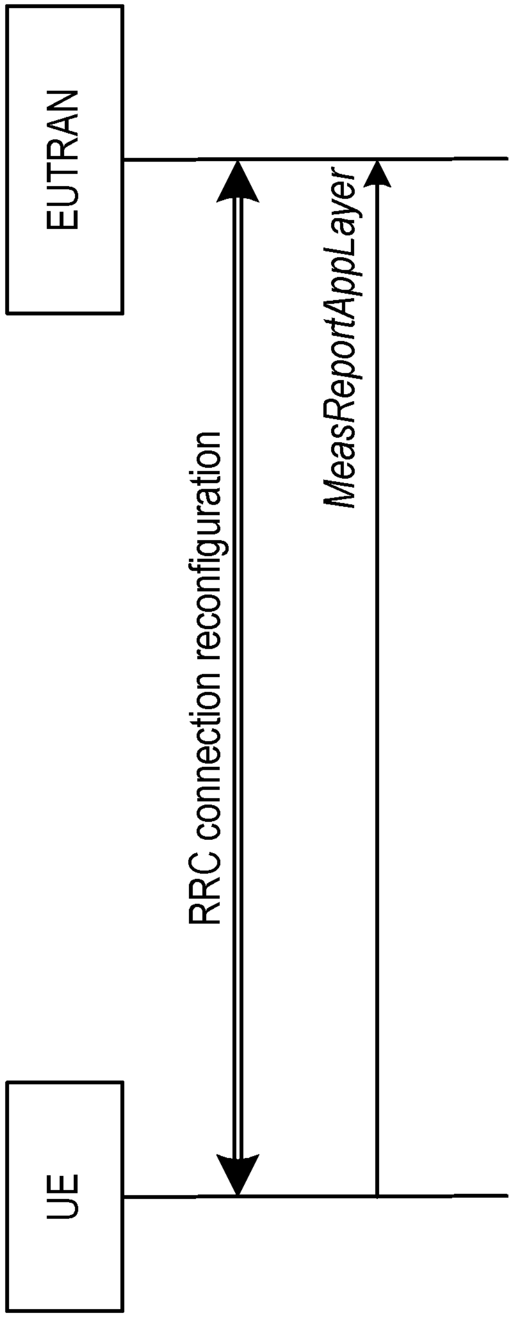
FIG. 8 is a signalling flow diagram for application layer measurement reporting using E-UTRAN.
Figure 9:
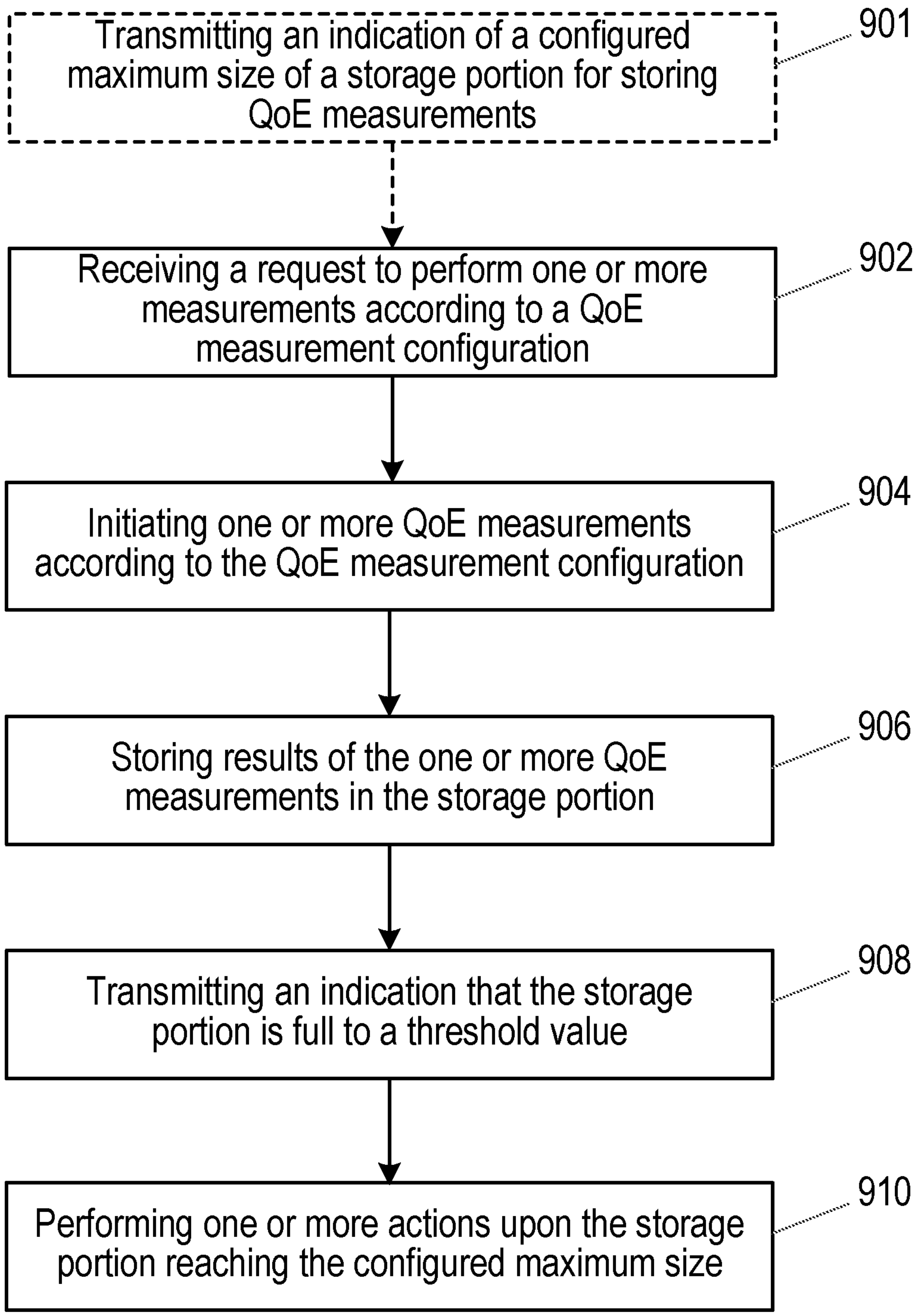
FIGS. 9 and 10 are flowcharts illustrating methods in accordance with some embodiments.

FIG. 9 depicts a method in accordance with particular embodiments. The method may be performed by a wireless device or UE (such as the wireless device 1110 or UE 1200 described below).

The wireless device comprises a storage medium, e.g., a non-transitory machine-readable medium (such as memory), in which a storage portion is defined for the storage of QoE data, e.g., the results of QoE measurements (also referred to herein as QoE reports). The storage portion may be allocated, reserved or dedicated to the storage of such QoE data. The storage portion may be defined in the RRC layer of the wireless device.

The method begins optionally at step 901 with transmitting, to a base station, an indication of a configured maximum size of the storage portion. In step 902 the wireless device receives, from the base station, a request to perform one or more QoE measurements according to a QoE measurement configuration. The QoE measurement configuration may be based on the indicated configured maximum size. Alternatively, the wireless device may be configured by the network (e.g., by the base station) with a configured maximum size for the storage portion. This step may take place as part of step 902. Step 904 comprises initiating one or more QoE measurements according to the QoE measurement configuration. Step 906 comprises storing results of the one or more QoE measurements in a storage portion having a configured maximum size. Step 908 comprises, responsive to a determination that the storage portion is full to a threshold value, less than the configured maximum size, transmitting an indication of that fact to the base station. Step 910 comprises, responsive to a determination that the storage portion is full to the configured maximum size, performing one or more actions.

Figure 10:
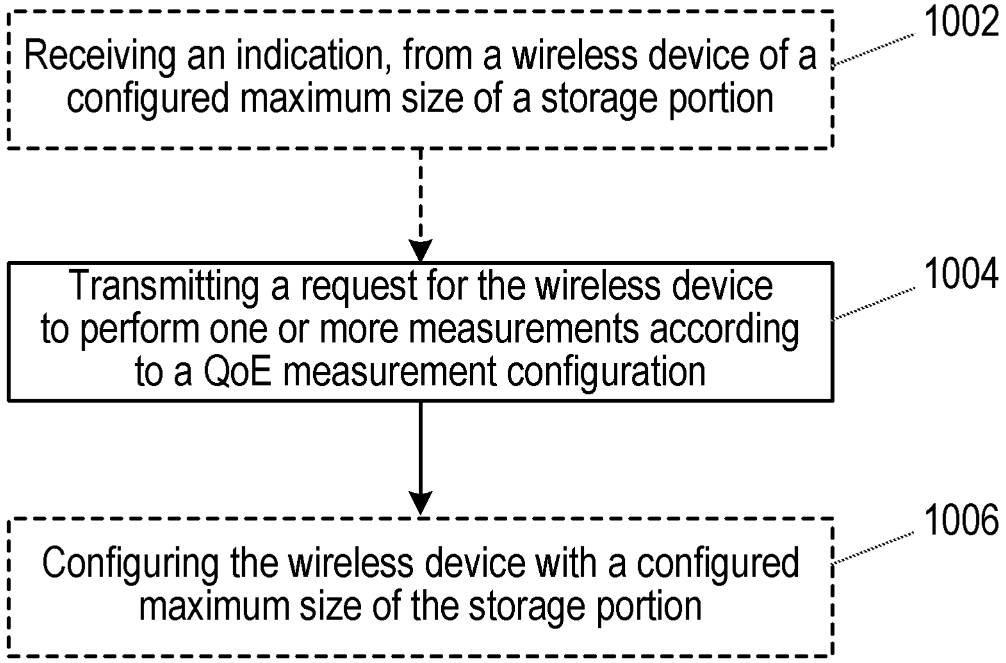

FIG. 10 depicts a method in accordance with particular embodiments. The method may be performed by a base station or similar network node, such as the network node 1160 described below. The method is for controlling the handling of QoE data in a wireless device. The wireless device comprises a storage medium (such as memory) having a storage portion allocated, reserved for or dedicated to the storage of QoE measurements.

In a first, optional, step 1002, the base station receives an indication, from a wireless device, of a configured maximum size of the storage portion. In step 1004, the base station transmits a request for the wireless device to perform one or more QoE measurements according to a QoE measurement configuration. In one embodiment, the QoE measurement configuration is configured based on the indicated configured maximum size received in step 1002. In a further optional step 1006, the network configures the wireless device with a configured maximum size of the storage portion. Such a configuration may take place as part of step 1004, with the configured maximum size being indicated in the QoE measurement configuration, for example. It will be noted that step 1006 may particularly be performed where step 1002 is not performed. However, it is also possible that both steps 1002 and 1006 are performed, for example with the base station, in step 1006, altering the configured maximum size indicated in step 1002.

The following description sets out further detail of the methods described above with respect to FIGS. 9 and 10.

Thus according to embodiments of the disclosure, the storage portion has a configured maximum size.

In one embodiment, the configured maximum size is hard-coded in the wireless device, e.g., by a manufacturer of the device, according to the manufacturer or an operators specification or for compliance with one or more technical specifications. In such embodiments, the configured maximum size for the QoE reports that the UE is required to store may be the same for all UEs and, for example, is defined in a technical specification. The size may be explicitly defined in the specification. An example implementation in 3GPP TS 38.306 may look like this:

| applicationLayerMeasurements-r17 |
|---|
| Indicates whether the UE supports application layer measurements. The memory size of application layer measurements is 64 KB. |

In one embodiment, a UE, by sending an indication to the network that it supports application layer measurements (e.g., using applicationLayerMeasurements-r17 described above) in step 901 or 1002, indicates to the network whether it supports the mentioned memory size at its RRC layer or not.

In an alternative embodiment, different UE capabilities may be defined depending on the maximum memory size for the QoE reports that the UE is able to store. The UE may inform the network about the supported memory size in step 901 or 1002. This may then be taken into account by the network when selecting UEs for QoE measurements and when defining the QoE configuration. Note that a UE may signal an available memory size that is greater than the size required according to a standard specification. An example of implementation in TS 38.306 may look like this:

applicationLayerMeasurementsSmall-r17

Indicates whether the UE supports application layer measurements. The memory size of application layer measurements in 32 KB.

application LayerMeasurementsMedium-r17

Indicates whether the UE supports application layer measurements. The memory size of application layer measurements is 64 KB.

applicationLayerMeasurementsLarge-r17

Indicates whether the UE supports application layer measurements. The memory size of application layer measurements is 128 KB.

In one option the network configures the maximum memory size for the QoE reports that the UE is required to store. The configured value may be based on an indicated UE separated memory and shared memory for different service types.

In an embodiment, the UE indicates to the network the memory size (or maximum memory size) allocated to each service (or different service types). It means the UE has different memory for storing QoE measurement reports of different service types and it indicates a list of memory size, one for each service type.

In a non-limiting example this can mean that the allocated maximum memory at a UE for service type 1 may be 32 KB and the allocated maximum memory size for service type 2 may be 64 KB, etc.

The memory size may be the maximum size allocated (possibly per service type) and it could be used for storing x number of reports, or alternatively it may be the maximum size allocated for one report (possibly for one service type).

In another embodiment, a UE may indicate to the network that the maximum memory allocated to QoE measurement data is shared among a set of services. Hence the QoE reports from different service types provided by upper layer are stored at the same memory/buffer.

In another embodiment, all considerations about available memory size per service type also apply for available memory size per slice.

In yet another embodiment, the allocated memory for QoE reports may be per radio access technologies (RATs) or it can be shared among different RATs. In a non-limiting example, UE may indicate to the network the allocated memory to store QoE reports in NR RAT, or it can indicate to the network the allocated memory to store QoE reports both in NR and LTE RRC.

If the allocated memory is shared among different RATs, the NR RRC can use the same memory allocated to the LTE RRC to store the QoE reports at RRC layer.

If the allocated memory is not shared among different RATs, the NR RRC uses its own memory for storing QoE reports and LTE RRC uses its own memory to store QoE reports.

In yet another embodiment, a UE can indicate the available memory size for legacy QoE reports, as per above, and the available memory size (total or per service) for the Lightweight QoE reports.

In yet another embodiment, a UE can indicate to the network its capabilities in terms of handling of reports whose maximum report size is reached (as per section 5.4). For example, a UE can indicate its capability to do QoE report data pre-processing, report compression, averaging of samples etc., with the goal of reducing the report size.

In another embodiment, the network can configure a UE to use its available memory as a memory pool to be shared by multiple service types or multiple RATs. Conversely, the network may also configure the UE to allocated separate shares of its memory available for QoE reports/measurement data for different service types. Such per service type separation may have different granularity, such that one share may be dedicated for service type 1 while another share is dedicated for sharing between service type 2 and service type 3.

Such separation of the memory may also be configured on service subtype level. As used here, the term "service subtype" refers to a hierarchical description of an application (or service) comprising service types and subservice types (also referred to as service subtypes or just subtypes). In some embodiments, conceptually—and possibly specification-wise—this concept may be considered to be similar to the type of class hierarchy used in object-oriented programming languages. A certain service (or application) may belong to a service type, but it may also belong to a subtype of this service type. A set of QoE metrics (and optionally QoE measurements and/or QoE measurement report types) may be specified/defined for the service type in general, while further QoE metrics (and optionally QoE measurements and/or QoE measurement report types) may be specified/defined specifically for the service subtype. A specific QoE measurement configuration pertaining to the service subtype may therefore comprise QoE metrics both from the service type level and the service subtype level.

The network may also configure the UE to separate shares of the available memory available memory for different RATs. Again, different granularities may be used, e.g. such that one share may be dedicated for NR while another share is dedicated for sharing between LTE and UMTS.

Memory separation and sharing may also be combined across service types and RATs. This may apply both for the case where the UE informs the network of its memory management and for the case where the network configures how the UE shall manage its memory for QoE reports/measurement data. For instance, a memory share dedicated for service type 1 may be further divided into shares for different RATs. Similarly, a memory share dedicated for RAT 1 may be further subdivided into shares for different service types (or service subtypes).

And as a further option, a memory share dedicated for a service type 1 may be further divided into shares for service subtypes belonging to service type 1.

The size of a memory share may be expressed as a fraction of the total memory available for QoE reports/measurement data, e.g. as a percentage. Such a definition of a memory share may also be applied when hierarchical division into memory shares is used. For instance, the memory share for a service subtype may be defined as a certain fraction (e.g. a percentage) of the memory share dedicated service type the service subtype belongs to. Alternatively, a memory share may be expressed in terms of bytes (or preferably kilobytes or megabytes or even gigabytes).

In another embodiment, the UE can consider two different levels used as "maximum memory size", one "reference level" of the maximum memory size, that the UE uses under normal handling, and an "emergency level" (higher than the "reference level") that an UE can use when a stretched handling (or emergency handling) is required. One example of emergency handling can be related to a critical service for which the past X QoE reports indicate a degradation and this indicates a critical condition which is of interest to be monitored.

The "emergency level" associated to a first service can be realized at the expense of a reduction of the "reference level" associated to a second service, e.g. based on a configurable priority level assigned to the second service that is lower relatively to the priority level assigned to the first service.

The stretched handling, in combination with the "emergency level" can be regulated by a timer, either hardcoded or configured, so that the special UE handling terminates due to timer expiration or due to reaching the maximum memory that can be allocated according to the "emergency level".

An example implementation in TS 38.306 may look like this:

applicationLayerMeasurementsEmergency-r17

Indicates whether the UE supports application layer measurements. The memory size of application layer measurements is 200 KB.

In step 908, the UE may be configured (by the network or a standard specification) to inform the network when the occupied part of the memory available for QoE reports/measurement data exceeds a certain fraction (e.g. 80%) of the total memory available for QoE reports/measurement data. This may trigger the network to configure the UE with instructions for how to act in case the memory becomes completely full (e.g. one or more of the previously described actions). To aid the network in this configuration, the UE may complement the memory occupation indication with information of what the memory is occupied with, e.g. the content of different allocated shares and/or the portions or sizes of the data that is used by QoE reports/measurement data pertaining to different service types, service subtypes, RATs and/or network slices.

The above described scheme for indication from the UE of a close to full memory followed by memory management instructions from the network may also be applied per share, i.e. such that the UE may report when a certain (large) fraction of the memory allocated to a share is occupied and the network may respond with instructions of how to deal with the situation if the share becomes completely full.

In some embodiments, a UE may be configured (by the network or a standard specification) with respect to the timer to use in case of emergency handling (in terms of memory allocation) and about a priority level or a flag (e.g. as part of the QoE configuration issued to the UE), indicating which service the emergency handling can be applied to.

In case multiple services are configured for emergency handling, the one with the highest priority can be considered as the one to which the emergency handling is applicable. If the priority is the same between services, the selected service for emergency handling can be the one with the worst performance (e.g. according to the last X lightweight QoE reports). Alternatively, a round robin approach can be used.

As noted above, in step 910, responsive to a determination that the storage portion has reached the configured maximum size (i.e., is full to that size), the wireless device or UE may take one or more actions. Thus the UE actions when the maximum size is reached may be specified. Examples of UE actions are as follows:

- The UE stops the measurements, transmits the last report and deletes the configuration.
- The UE transmits the report, deletes the report after transmission and continues measuring.
- The UE transmits the report and pauses the measurements.
- The UE stores the report until a later stage when it may be possible to transmit the report and pauses the measurements.
- The UE behaviour depends on the case, e.g. if it is possible to transmit the report.
  - If it is possible to transmit the report the UE e.g.:
    - transmits the report and continues measuring;
    - transmits the report, stops measuring and deletes the QoE configuration.
  - If it is not possible to transmit the report the UE e.g.:
    - stores the report until a later stage when it may be possible to transmit the report, stops measuring and deletes the configuration.
    - Stores the report until a later stage and pauses the measurements.
    - Decimates the stored samples (i.e. recorded values for a metric) in the report i.e. keeps y out of every x samples collected for one or more metrics, and deletes the remaining x-y out of every x samples
    - Performs averaging of all collected sample values or a group of collected sample values (e.g. averaging of every 100 consecutive samples)
    - Converts the report into a lightweight QoE report form

- The UE deletes a report pertaining to a specific service type in accordance with a priority order, wherein this deletion leaves room for further measurement data
  - The priority order may stipulate that lightweight QoE reports should be deleted first.
  - The priority order may stipulate that regular QoE reports should be deleted first (i.e. keeping lightweight QoE reports in the memory is prioritized).
- If the UE can make use of an emergency handling, it can enable it, extends the collection for a first service and can apply at least one of the previous actions to reduce the memory allocation associated to a second service (e.g. decimates stored samples, averaging of collected samples, conversion into a lightweight QoE, deletion of regular QoE reports or regular QoE report according to a priority)

In one embodiment, a UE indicates to the network, together with the QoE report, what kind of pre-processing it has executed on a report that reached its maximum size, as per above.

As mentioned above, the UE's behavior when the memory available for QoE reports is full may be specified. As an alternative, this behavior may be configured by the network.

The network may thus configure a priority order between different service types. The priority order may also be configured with QoE measurement configuration granularity and realized through a priority number included in each QoE measurement configuration.

If the UE is forced to choose between deletion of two measurement reports with the same priority, the UE may be configured, as one option, to delete the oldest of the reports, or, as another option, to delete the newest of the reports.

When service subtyping is used, the network may further configure (or this may be specified in a standard specification) priority orders between service subtypes within a service type.

A configuration provided by the network (or a standard specification) may also stipulate priority a priority order between QoE measurement data collected in different RATs, such that different RATs have different priorities when deletion of stored QoE measurement data becomes necessary. Within each RAT a further priority order may be applied between different service types (and different service subtypes).

Similarly, when a priority order is configured between different service types (and possibly service subtypes), a further priority order may be provided for different RATs within each service type (or service subtype).

When the UE's memory management is configured by the network, this may originate from the O&M system, sent to the RAN and forwarded to the UE. Alternatively, the RAN may determine the management behavior, create the configuration and transfer it to the UE. As yet another alternative, the O&M system may be responsible for the memory management related to regular QoE reports/measurement data, while the RAN is responsible for the memory management related to lightweight QoE reports/measurement data.

All the considerations above with respect to prioritization and deletion of the QoE reports pertaining to different service types (and possibly service subtypes) and different RATs are equally applicable for different network slices.

As a further option, in some embodiments. The network may configure (or it may be specified in a standard specification) relocation of memory between different memory shares when the memory dedicated for one or more share(s) is/are full, while other memory shares still have some space available. For instance, if the memory share for service type 1 is full, while further QoE measurement data pertaining to service type 1 is expected to be collected, memory from a share dedicated for QoE reports/measurement data pertaining to service type 2 may be reallocated to the share for service type 1. This may be an unconditional decision/configuration by the network or it may be a conditional configuration, e.g. stating that such reallocation should be performed only if the QoE measurements for service type 2 has been concluded (i.e. that no more QoE measurement data to be stored in the memory share for service type 2 is expected with the UE's current QoE measurement configuration(s). The memory reallocation configuration may also be flexible, leaving much of the assessment and decision to the UE, e.g. such that the UE should perform the memory reallocation if it determines that it is unlikely that the share from which memory will be taken would have needed this reallocated memory, even if the collection of QoE measurement data to be stored in that share is not yet concluded.

The above described reallocation of memory between separate memory shares may not only be performed between memory shares for different service types but also between memory shares for different subtypes, between memory shares for different RATs or between memory shares for different network slices. For instance, when the memory share for RAT 1 is full while the memory share for RAT 2 is empty, memory may be reallocated from the share for RAT 2 to the share for RAT 1. The reallocation of memory between shares for different RATs may also be conditioned on RAT availability. For instance, reallocation of memory from the share for RAT X to the share for RAT Y may be allowed only if RAT X is not available for the UE.

As a further option, the network (or a standard specification) may configure which shares memory may be reallocated from (provided that any other condition for the memory reallocation is fulfilled). Similarly, the network (or a standard specification) may configure which shares memory may be reallocated to. As a further option, the network (or a standard specification) may configure that memory may be reallocated from a first share to a second share only if the first share is dedicated for a service type, service subtype, RAT or network slice, which has a lower priority (in terms of the previously described priority ordering, e.g. for deletion of QoE reports/measurement data) than the service type, service subtype, RAT or network slice that the second share is dedicated for.

The above described methods for memory reallocation between shares may be performed among memory shares containing regular QoE reports/measurement data or among memory shares containing lightweight QoE reports/measurement data. Or, alternatively, memory may be reallocated also between shares containing (or dedicated for) different types (i.e. regular or lightweight) of QoE reports/measurement data.

Figure 11:
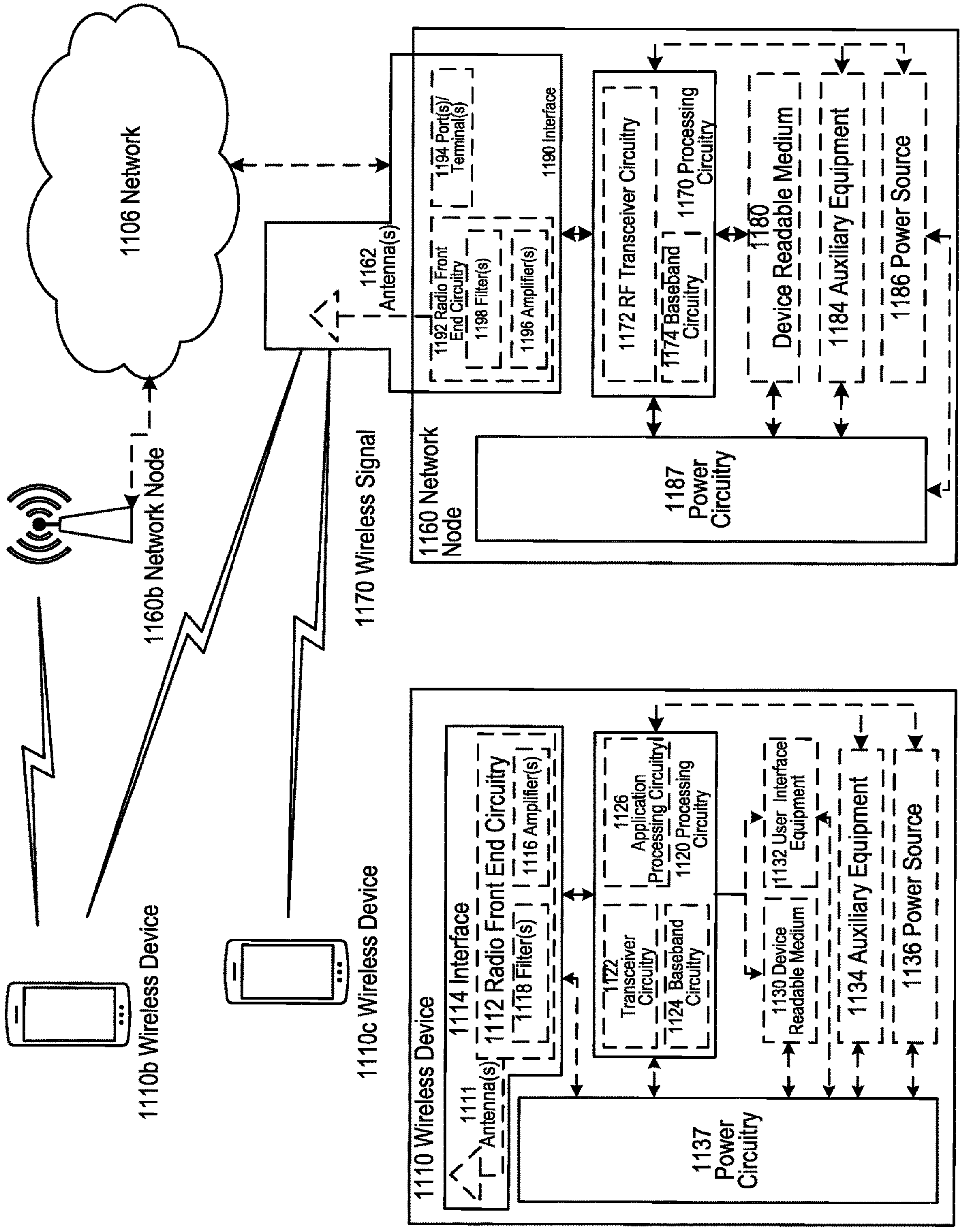
FIG. 11 schematically illustrates a wireless network in accordance with some embodiments.

Although the subject matter described herein may be implemented in any appropriate type of system using any suitable components, the embodiments disclosed herein are described in relation to a wireless network, such as the example wireless network illustrated in FIG. 11. For simplicity, the wireless network of FIG. 11 only depicts network 1106, network nodes 1160 and 1160*b*, and WDs 1110, 1110*b*, and 1110*c*. In practice, a wireless network may further include any additional elements suitable to support communication between wireless devices or between a wireless device and another communication device, such as a landline telephone, a service provider, or any other network node or end device. Of the illustrated components, network node 1160 and wireless device (WD) 1110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1160 and WD 1110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 11, network node 1160 includes processing circuitry 1170, device readable medium 1180, interface 1190, auxiliary equipment 1184, power source 1186, power circuitry 1187, and antenna 1162. Although network node 1160 illustrated in the example wireless network of FIG. 11 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1160 are depicted as single boxes located within a larger box, or nested within multiple boxes, in practice, a network node may comprise multiple different physical components that make up a single illustrated component (e.g., device readable medium 1180 may comprise multiple separate hard drives as well as multiple RAM modules).

Similarly, network node 1160 may be composed of multiple physically separate components (e.g., a NodeB component and a RNC component, or a BTS component and a BSC component, etc.), which may each have their own respective components. In certain scenarios in which network node 1160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1160 may be configured to support multiple radio access technologies (RATs). In such embodiments, some components may be duplicated (e.g., separate device readable medium 1180 for the different RATs) and some components may be reused (e.g., the same antenna 1162 may be shared by the RATs). Network node 1160 may also include multiple sets of the various illustrated components for different wireless technologies integrated into network node 1160, such as, for example, GSM, WCDMA, LTE, NR, WiFi, or Bluetooth wireless technologies. These wireless technologies may be integrated into the same or different chip or set of chips and other components within network node 1160.

Processing circuitry 1170 is configured to perform any determining, calculating, or similar operations (e.g., certain obtaining operations) described herein as being provided by a network node. These operations performed by processing circuitry 1170 may include processing information obtained by processing circuitry 1170 by, for example, converting the obtained information into other information, comparing the obtained information or converted information to information stored in the network node, and/or performing one or more operations based on the obtained information or converted information, and as a result of said processing making a determination.

Processing circuitry 1170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1160 components, such as device readable medium 1180, network node 1160 functionality. For example, processing circuitry 1170 may execute instructions stored in device readable medium 1180 or in memory within processing circuitry 1170. Such functionality may include providing any of the various wireless features, functions, or benefits discussed herein. In some embodiments, processing circuitry 1170 may include a system on a chip (SOC).

In some embodiments, processing circuitry 1170 may include one or more of radio frequency (RF) transceiver circuitry 1172 and baseband processing circuitry 1174. In some embodiments, radio frequency (RF) transceiver circuitry 1172 and baseband processing circuitry 1174 may be on separate chips (or sets of chips), boards, or units, such as radio units and digital units. In alternative embodiments, part or all of RF transceiver circuitry 1172 and baseband processing circuitry 1174 may be on the same chip or set of chips, boards, or units In certain embodiments, some or all of the functionality described herein as being provided by a network node, base station, eNB or other such network device may be performed by processing circuitry 1170 executing instructions stored on device readable medium 1180 or memory within processing circuitry 1170. In alternative embodiments, some or all of the functionality may be provided by processing circuitry 1170 without executing instructions stored on a separate or discrete device readable medium, such as in a hard-wired manner. In any of those embodiments, whether executing instructions stored on a device readable storage medium or not, processing circuitry 1170 can be configured to perform the described functionality. The benefits provided by such functionality are not limited to processing circuitry 1170 alone or to other components of network node 1160, but are enjoyed by network node 1160 as a whole, and/or by end users and the wireless network generally.

Device readable medium 1180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1170. Device readable medium 1180 may store any suitable instructions, data or information, including a computer program, software, an application including one or more of logic, rules, code, tables, etc. and/or other instructions capable of being executed by processing circuitry 1170 and, utilized by network node 1160. Device readable medium 1180 may be used to store any calculations made by processing circuitry 1170 and/or any data received via interface 1190. In some embodiments, processing circuitry 1170 and device readable medium 1180 may be considered to be integrated.

Interface 1190 is used in the wired or wireless communication of signalling and/or data between network node 1160, network 1106, and/or WDs 1110. As illustrated, interface 1190 comprises port(s)/terminal(s) 1194 to send and receive data, for example to and from network 1106 over a wired connection. Interface 1190 also includes radio front end circuitry 1192 that may be coupled to, or in certain embodiments a part of, antenna 1162. Radio front end circuitry 1192 comprises filters 1198 and amplifiers 1196. Radio front end circuitry 1192 may be connected to antenna 1162 and processing circuitry 1170. Radio front end circuitry may be configured to condition signals communicated between antenna 1162 and processing circuitry 1170. Radio front end circuitry 1192 may receive digital data that is to be sent out to other network nodes or WDs via a wireless connection. Radio front end circuitry 1192 may convert the digital data into a radio signal having the appropriate channel and bandwidth parameters using a combination of filters 1198 and/or amplifiers 1196. The radio signal may then be transmitted via antenna 1162. Similarly, when receiving data, antenna 1162 may collect radio signals which are then converted into digital data by radio front end circuitry 1192. The digital data may be passed to processing circuitry 1170. In other embodiments, the interface may comprise different components and/or different combinations of components.

In certain alternative embodiments, network node 1160 may not include separate radio front end circuitry 1192, instead, processing circuitry 1170 may comprise radio front end circuitry and may be connected to antenna 1162 without separate radio front end circuitry 1192. Similarly, in some embodiments, all or some of RF transceiver circuitry 1172 may be considered a part of interface 1190. In still other embodiments, interface 1190 may include one or more ports or terminals 1194, radio front end circuitry 1192, and RF transceiver circuitry 1172, as part of a radio unit (not shown), and interface 1190 may communicate with baseband processing circuitry 1174, which is part of a digital unit (not shown).

Antenna 1162 may include one or more antennas, or antenna arrays, configured to send and/or receive wireless signals. Antenna 1162 may be coupled to radio front end circuitry 1190 and may be any type of antenna capable of transmitting and receiving data and/or signals wirelessly. In some embodiments, antenna 1162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1162 may be separate from network node 1160 and may be connectable to network node 1160 through an interface or port.

Antenna 1162, interface 1190, and/or processing circuitry 1170 may be configured to perform any receiving operations and/or certain obtaining operations described herein as being performed by a network node. Any information, data and/or signals may be received from a wireless device, another network node and/or any other network equipment. Similarly, antenna 1162, interface 1190, and/or processing circuitry 1170 may be configured to perform any transmitting operations described herein as being performed by a network node. Any information, data and/or signals may be transmitted to a wireless device, another network node and/or any other network equipment.

Power circuitry 1187 may comprise, or be coupled to, power management circuitry and is configured to supply the components of network node 1160 with power for performing the functionality described herein. Power circuitry 1187 may receive power from power source 1186. Power source 1186 and/or power circuitry 1187 may be configured to provide power to the various components of network node 1160 in a form suitable for the respective components (e.g., at a voltage and current level needed for each respective component). Power source 1186 may either be included in, or external to, power circuitry 1187 and/or network node 1160. For example, network node 1160 may be connectable to an external power source (e.g., an electricity outlet) via an input circuitry or interface such as an electrical cable, whereby the external power source supplies power to power circuitry 1187. As a further example, power source 1186 may comprise a source of power in the form of a battery or battery pack which is connected to, or integrated in, power circuitry 1187. The battery may provide backup power should the external power source fail. Other types of power sources, such as photovoltaic devices, may also be used.

Alternative embodiments of network node 1160 may include additional components beyond those shown in FIG. 11 that may be responsible for providing certain aspects of the network node's functionality, including any of the functionality described herein and/or any functionality necessary to support the subject matter described herein. For example, network node 1160 may include user interface equipment to allow input of information into network node 1160 and to allow output of information from network node 1160. This may allow a user to perform diagnostic, maintenance, repair, and other administrative functions for network node 1160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (Vol P) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1110 includes antenna 1111, interface 1114, processing circuitry 1120, device readable medium 1130, user interface equipment 1132, auxiliary equipment 1134, power source 1136 and power circuitry 1137. WD 1110 may include multiple sets of one or more of the illustrated components for different wireless technologies supported by WD 1110, such as, for example, GSM, WCDMA, LTE, NR, WiFi, WiMAX, or Bluetooth wireless technologies, just to mention a few. These wireless technologies may be integrated into the same or different chips or set of chips as other components within WD 1110.

Antenna 1111 may include one or more antennas or antenna arrays, configured to send and/or receive wireless signals, and is connected to interface 1114. In certain alternative embodiments, antenna 1111 may be separate from WD 1110 and be connectable to WD 1110 through an interface or port. Antenna 1111, interface 1114, and/or processing circuitry 1120 may be configured to perform any receiving or transmitting operations described herein as being performed by a WD. Any information, data and/or signals may be received from a network node and/or another WD. In some embodiments, radio front end circuitry and/or antenna 1111 may be considered an interface.

As illustrated, interface 1114 comprises radio front end circuitry 1112 and antenna 1111. Radio front end circuitry 1112 comprise one or more filters 1118 and amplifiers 1116. Radio front end circuitry 1114 is connected to antenna 1111 and processing circuitry 1120, and is configured to condition signals communicated between antenna 1111 and processing circuitry 1120. Radio front end circuitry 1112 may be coupled to or a part of antenna 1111. In some embodiments, WD 1110 may not include separate radio front end circuitry 1112; rather, processing circuitry 1120 may comprise radio front end circuitry and may be connected to antenna 1111. Similarly, in some embodiments, some or all of RF transceiver circuitry 1122 may be considered a part of interface 1114. Radio front end circuitry 1112 may receive digital data that is to be sent out to other network nodes or WDs via a wireless connection. Radio front end circuitry 1112 may convert the digital data into a radio signal having the appropriate channel and bandwidth parameters using a combination of filters 1118 and/or amplifiers 1116. The radio signal may then be transmitted via antenna 1111. Similarly, when receiving data, antenna 1111 may collect radio signals which are then converted into digital data by radio front end circuitry 1112. The digital data may be passed to processing circuitry 1120. In other embodiments, the interface may comprise different components and/or different combinations of components.

Processing circuitry 1120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1110 components, such as device readable medium 1130, WD 1110 functionality. Such functionality may include providing any of the various wireless features or benefits discussed herein. For example, processing circuitry 1120 may execute instructions stored in device readable medium 1130 or in memory within processing circuitry 1120 to provide the functionality disclosed herein.

As illustrated, processing circuitry 1120 includes one or more of RF transceiver circuitry 1122, baseband processing circuitry 1124, and application processing circuitry 1126. In other embodiments, the processing circuitry may comprise different components and/or different combinations of components. In certain embodiments processing circuitry 1120 of WD 1110 may comprise a SOC. In some embodiments, RF transceiver circuitry 1122, baseband processing circuitry 1124, and application processing circuitry 1126 may be on separate chips or sets of chips. In alternative embodiments, part or all of baseband processing circuitry 1124 and application processing circuitry 1126 may be combined into one chip or set of chips, and RF transceiver circuitry 1122 may be on a separate chip or set of chips. In still alternative embodiments, part or all of RF transceiver circuitry 1122 and baseband processing circuitry 1124 may be on the same chip or set of chips, and application processing circuitry 1126 may be on a separate chip or set of chips. In yet other alternative embodiments, part or all of RF transceiver circuitry 1122, baseband processing circuitry 1124, and application processing circuitry 1126 may be combined in the same chip or set of chips. In some embodiments, RF transceiver circuitry 1122 may be a part of interface 1114. RF transceiver circuitry 1122 may condition RF signals for processing circuitry 1120.

In certain embodiments, some or all of the functionality described herein as being performed by a WD may be provided by processing circuitry 1120 executing instructions stored on device readable medium 1130, which in certain embodiments may be a computer-readable storage medium. In alternative embodiments, some or all of the functionality may be provided by processing circuitry 1120 without executing instructions stored on a separate or discrete device readable storage medium, such as in a hard-wired manner. In any of those particular embodiments, whether executing instructions stored on a device readable storage medium or not, processing circuitry 1120 can be configured to perform the described functionality. The benefits provided by such functionality are not limited to processing circuitry 1120 alone or to other components of WD 1110, but are enjoyed by WD 1110 as a whole, and/or by end users and the wireless network generally.

Processing circuitry 1120 may be configured to perform any determining, calculating, or similar operations (e.g., certain obtaining operations) described herein as being performed by a WD. These operations, as performed by processing circuitry 1120, may include processing information obtained by processing circuitry 1120 by, for example, converting the obtained information into other information, comparing the obtained information or converted information to information stored by WD 1110, and/or performing one or more operations based on the obtained information or converted information, and as a result of said processing making a determination.

Device readable medium 1130 may be operable to store a computer program, software, an application including one or more of logic, rules, code, tables, etc. and/or other instructions capable of being executed by processing circuitry 1120. Device readable medium 1130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1120. In some embodiments, processing circuitry 1120 and device readable medium 1130 may be considered to be integrated.

User interface equipment 1132 may provide components that allow for a human user to interact with WD 1110. Such interaction may be of many forms, such as visual, audial, tactile, etc. User interface equipment 1132 may be operable to produce output to the user and to allow the user to provide input to WD 1110. The type of interaction may vary depending on the type of user interface equipment 1132 installed in WD 1110. For example, if WD 1110 is a smart phone, the interaction may be via a touch screen; if WD 1110 is a smart meter, the interaction may be through a screen that provides usage (e.g., the number of gallons used) or a speaker that provides an audible alert (e.g., if smoke is detected). User interface equipment 1132 may include input interfaces, devices and circuits, and output interfaces, devices and circuits. User interface equipment 1132 is configured to allow input of information into WD 1110, and is connected to processing circuitry 1120 to allow processing circuitry 1120 to process the input information. User interface equipment 1132 may include, for example, a microphone, a proximity or other sensor, keys/buttons, a touch display, one or more cameras, a USB port, or other input circuitry. User interface equipment 1132 is also configured to allow output of information from WD 1110, and to allow processing circuitry 1120 to output information from WD 1110. User interface equipment 1132 may include, for example, a speaker, a display, vibrating circuitry, a USB port, a headphone interface, or other output circuitry. Using one or more input and output interfaces, devices, and circuits, of user interface equipment 1132, WD 1110 may communicate with end users and/or the wireless network, and allow them to benefit from the functionality described herein.

Auxiliary equipment 1134 is operable to provide more specific functionality which may not be generally performed by WDs. This may comprise specialized sensors for doing measurements for various purposes, interfaces for additional types of communication such as wired communications etc. The inclusion and type of components of auxiliary equipment 1134 may vary depending on the embodiment and/or scenario.

Power source 1136 may, in some embodiments, be in the form of a battery or battery pack. Other types of power sources, such as an external power source (e.g., an electricity outlet), photovoltaic devices or power cells, may also be used. WD 1110 may further comprise power circuitry 1137 for delivering power from power source 1136 to the various parts of WD 1110 which need power from power source 1136 to carry out any functionality described or indicated herein. Power circuitry 1137 may in certain embodiments comprise power management circuitry. Power circuitry 1137 may additionally or alternatively be operable to receive power from an external power source; in which case WD 1110 may be connectable to the external power source (such as an electricity outlet) via input circuitry or an interface such as an electrical power cable. Power circuitry 1137 may also in certain embodiments be operable to deliver power from an external power source to power source 1136. This may be, for example, for the charging of power source 1136. Power circuitry 1137 may perform any formatting, converting, or other modification to the power from power source 1136 to make the power suitable for the respective components of WD 1110 to which power is supplied.

Figure 12:
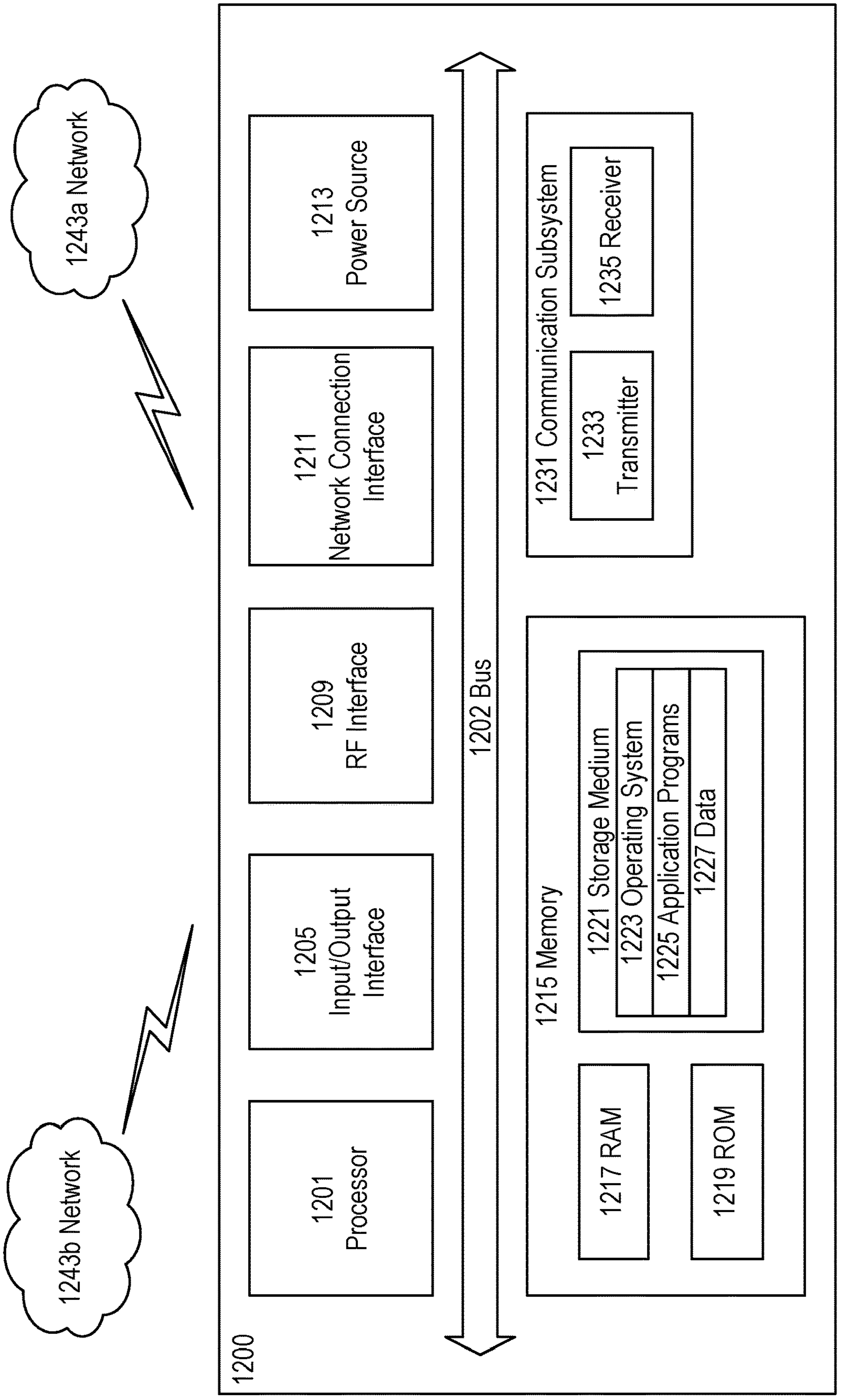
FIG. 12 schematically illustrates a user equipment in accordance with some embodiments.

FIG. 12 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 1200 may be any UE identified by the 3 rd Generation Partnership Project (3GPP), including a NB-IoT UE, a machine type communication (MTC) UE, and/or an enhanced MTC (eMTC) UE. UE 1200, as illustrated in FIG. 12, is one example of a WD configured for communication in accordance with one or more communication standards promulgated by the 3 rd Generation Partnership Project (3GPP), such as 3GPP's GSM, UMTS, LTE, and/or 5G standards. As mentioned previously, the term WD and UE may be used interchangeable. Accordingly, although FIG. 12 is a UE, the components discussed herein are equally applicable to a WD, and vice-versa.

In FIG. 12, UE 1200 includes processing circuitry 1201 that is operatively coupled to input/output interface 1205, radio frequency (RF) interface 1209, network connection interface 1211, memory 1215 including random access memory (RAM) 1217, read-only memory (ROM) 1219, and storage medium 1221 or the like, communication subsystem 1231, power source 1233, and/or any other component, or any combination thereof. Storage medium 1221 includes operating system 1223, application program 1225, and data 1227. In other embodiments, storage medium 1221 may include other similar types of information. Certain UEs may utilize all of the components shown in FIG. 12, or only a subset of the components. The level of integration between the components may vary from one UE to another UE. Further, certain UEs may contain multiple instances of a component, such as multiple processors, memories, transceivers, transmitters, receivers, etc.

In FIG. 12, processing circuitry 1201 may be configured to process computer instructions and data. Processing circuitry 1201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1201 may include two central processing units (CPUs). Data may be information in a form suitable for use by a computer.

In the depicted embodiment, input/output interface 1205 may be configured to provide a communication interface to an input device, output device, or input and output device. UE 1200 may be configured to use an output device via input/output interface 1205. An output device may use the same type of interface port as an input device. For example, a USB port may be used to provide input to and output from UE 1200. The output device may be a speaker, a sound card, a video card, a display, a monitor, a printer, an actuator, an emitter, a smartcard, another output device, or any combination thereof. UE 1200 may be configured to use an input device via input/output interface 1205 to allow a user to capture information into UE 1200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 12, RF interface 1209 may be configured to provide a communication interface to RF components such as a transmitter, a receiver, and an antenna. Network connection interface 1211 may be configured to provide a communication interface to network **1243*a*. Network 1243*a* may encompass wired and/or wireless networks such as a local-area network (LAN), a wide-area network (WAN), a computer network, a wireless network, a telecommunications network, another like network or any combination thereof. For example, network 1243*a* may comprise a Wi-Fi network. Network connection interface 1211 may be configured to include a receiver and a transmitter interface used to communicate with one or more other devices over a communication network according to one or more communication protocols, such as Ethernet, TCP/IP, SONET, ATM, or the like. Network connection interface 1211** may implement receiver and transmitter functionality appropriate to the communication network links (e.g., optical, electrical, and the like). The transmitter and receiver functions may share circuit components, software or firmware, or alternatively may be implemented separately.

RAM 1217 may be configured to interface via bus 1202 to processing circuitry 1201 to provide storage or caching of data or computer instructions during the execution of software programs such as the operating system, application programs, and device drivers. ROM 1219 may be configured to provide computer instructions or data to processing circuitry 1201. For example, ROM 1219 may be configured to store invariant low-level system code or data for basic system functions such as basic input and output (I/O), startup, or reception of keystrokes from a keyboard that are stored in a non-volatile memory. Storage medium 1221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1221 may be configured to include operating system 1223, application program 1225 such as a web browser application, a widget or gadget engine or another application, and data file 1227. Storage medium 1221 may store, for use by UE 1200, any of a variety of various operating systems or combinations of operating systems.

Storage medium 1221 may be configured to include a number of physical drive units, such as redundant array of independent disks (RAID), floppy disk drive, flash memory, USB flash drive, external hard disk drive, thumb drive, pen drive, key drive, high-density digital versatile disc (HD- DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1221 may allow UE 1200 to access computer-executable instructions, application programs or the like, stored on transitory or non-transitory memory media, to off-load data, or to upload data. An article of manufacture, such as one utilizing a communication system may be tangibly embodied in storage medium 1221, which may comprise a device readable medium.

In FIG. 12, processing circuitry 1201 may be configured to communicate with network 1243*b* using communication subsystem 1231. Network 1243*a* and network 1243*b* may be the same network or networks or different network or networks. Communication subsystem 1231 may be configured to include one or more transceivers used to communicate with network 1243*b*. For example, communication subsystem 1231 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 1233 and/or receiver 1235 to implement transmitter or receiver functionality, respectively, appropriate to the RAN links (e.g., frequency allocations and the like). Further, transmitter 1233 and receiver 1235 of each transceiver may share circuit components, software or firmware, or alternatively may be implemented separately.

In the illustrated embodiment, the communication functions of communication subsystem 1231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1231 may include cellular communication, Wi-Fi communication, Bluetooth communication, and GPS communication. Network 1243*b* may encompass wired and/or wireless networks such as a local-area network (LAN), a wide-area network (WAN), a computer network, a wireless network, a telecommunications network, another like network or any combination thereof. For example, network 1243*b* may be a cellular network, a Wi-Fi network, and/or a near-field network. Power source 1213 may be configured to provide alternating current (AC) or direct current (DC) power to components of UE 1200.

The features, benefits and/or functions described herein may be implemented in one of the components of UE 1200 or partitioned across multiple components of UE 1200. Further, the features, benefits, and/or functions described herein may be implemented in any combination of hardware, software or firmware. In one example, communication subsystem 1231 may be configured to include any of the components described herein. Further, processing circuitry 1201 may be configured to communicate with any of such components over bus 1202. In another example, any of such components may be represented by program instructions stored in memory that when executed by processing circuitry 1201 perform the corresponding functions described herein. In another example, the functionality of any of such components may be partitioned between processing circuitry 1201 and communication subsystem 1231. In another example, the non-computationally intensive functions of any of such components may be implemented in software or firmware and the computationally intensive functions may be implemented in hardware.

Figure 13:
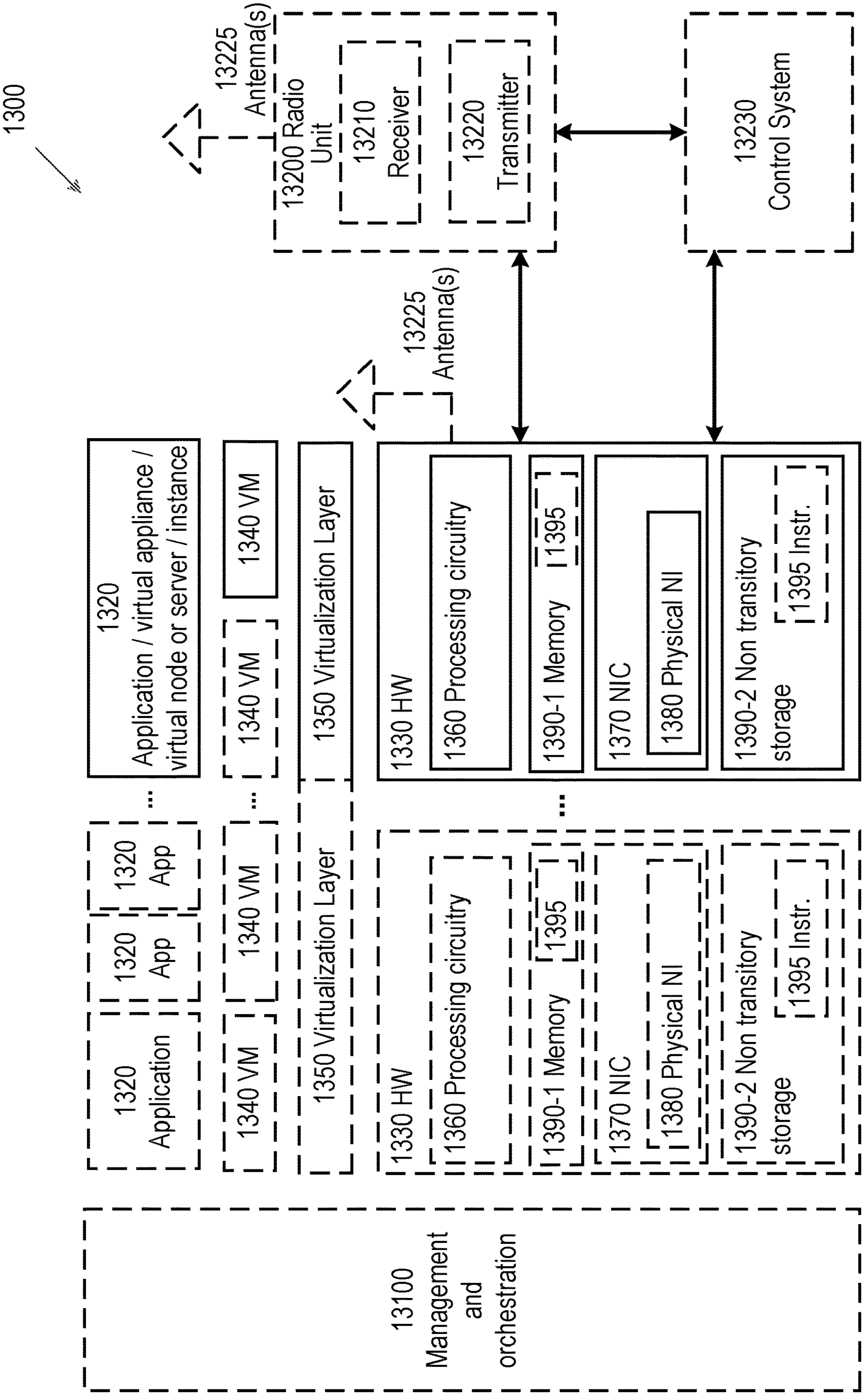
FIG. 13 schematically illustrates a virtualization environment in accordance with some embodiments.

FIG. 13 is a schematic block diagram illustrating a virtualization environment 1300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1300 hosted by one or more of hardware nodes 1330. Further, in embodiments in which the virtual node is not a radio access node or does not require radio connectivity (e.g., a core network node), then the network node may be entirely virtualized.

The functions may be implemented by one or more applications 1320 (which may alternatively be called software instances, virtual appliances, network functions, virtual nodes, virtual network functions, etc.) operative to implement some of the features, functions, and/or benefits of some of the embodiments disclosed herein. Applications 1320 are run in virtualization environment 1300 which provides hardware 1330 comprising processing circuitry 1360 and memory 1390. Memory 1390 contains instructions 1395 executable by processing circuitry 1360 whereby application 1320 is operative to provide one or more of the features, benefits, and/or functions disclosed herein.

Virtualization environment 1300, comprises general-purpose or special-purpose network hardware devices 1330 comprising a set of one or more processors or processing circuitry 1360, which may be commercial off-the-shelf (COTS) processors, dedicated Application Specific Integrated Circuits (ASICs), or any other type of processing circuitry including digital or analog hardware components or special purpose processors. Each hardware device may comprise memory 1390-1 which may be non-persistent memory for temporarily storing instructions 1395 or software executed by processing circuitry 1360. Each hardware device may comprise one or more network interface controllers (NICs) 1370, also known as network interface cards, which include physical network interface 1380. Each hardware device may also include non-transitory, persistent, machine-readable storage media 1390-2 having stored therein software 1395 and/or instructions executable by processing circuitry 1360. Software 1395 may include any type of software including software for instantiating one or more virtualization layers 1350 (also referred to as hypervisors), software to execute virtual machines 1340 as well as software allowing it to execute functions, features and/or benefits described in relation with some embodiments described herein.

Virtual machines 1340, comprise virtual processing, virtual memory, virtual networking or interface and virtual storage, and may be run by a corresponding virtualization layer 1350 or hypervisor. Different embodiments of the instance of virtual appliance 1320 may be implemented on one or more of virtual machines 1340, and the implementations may be made in different ways.

During operation, processing circuitry 1360 executes software 1395 to instantiate the hypervisor or virtualization layer 1350, which may sometimes be referred to as a virtual machine monitor (VMM). Virtualization layer 1350 may present a virtual operating platform that appears like networking hardware to virtual machine 1340.

As shown in FIG. 13, hardware 1330 may be a standalone network node with generic or specific components. Hardware 1330 may comprise antenna 13225 and may implement some functions via virtualization. Alternatively, hardware 1330 may be part of a larger cluster of hardware (e.g. such as in a data center or customer premise equipment (CPE)) where many hardware nodes work together and are managed via management and orchestration (MANO) 13100, which, among others, oversees lifecycle management of applications 1320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1340 may be a software implementation of a physical machine that runs programs as if they were executing on a physical, non-virtualized machine. Each of virtual machines 1340, and that part of hardware 1330 that executes that virtual machine, be it hardware dedicated to that virtual machine and/or hardware shared by that virtual machine with others of the virtual machines 1340, forms a separate virtual network elements (VNE).

Still in the context of NFV, Virtual Network Function (VNF) is responsible for handling specific network functions that run in one or more virtual machines 1340 on top of hardware networking infrastructure 1330 and corresponds to application 1320 in FIG. 13.

In some embodiments, one or more radio units 13200 that each include one or more transmitters 13220 and one or more receivers 13210 may be coupled to one or more antennas 13225. Radio units 13200 may communicate directly with hardware nodes 1330 via one or more appropriate network interfaces and may be used in combination with the virtual components to provide a virtual node with radio capabilities, such as a radio access node or a base station.

In some embodiments, some signalling can be effected with the use of control system 13230 which may alternatively be used for communication between the hardware nodes 1330 and radio units 13200.

Figure 14:
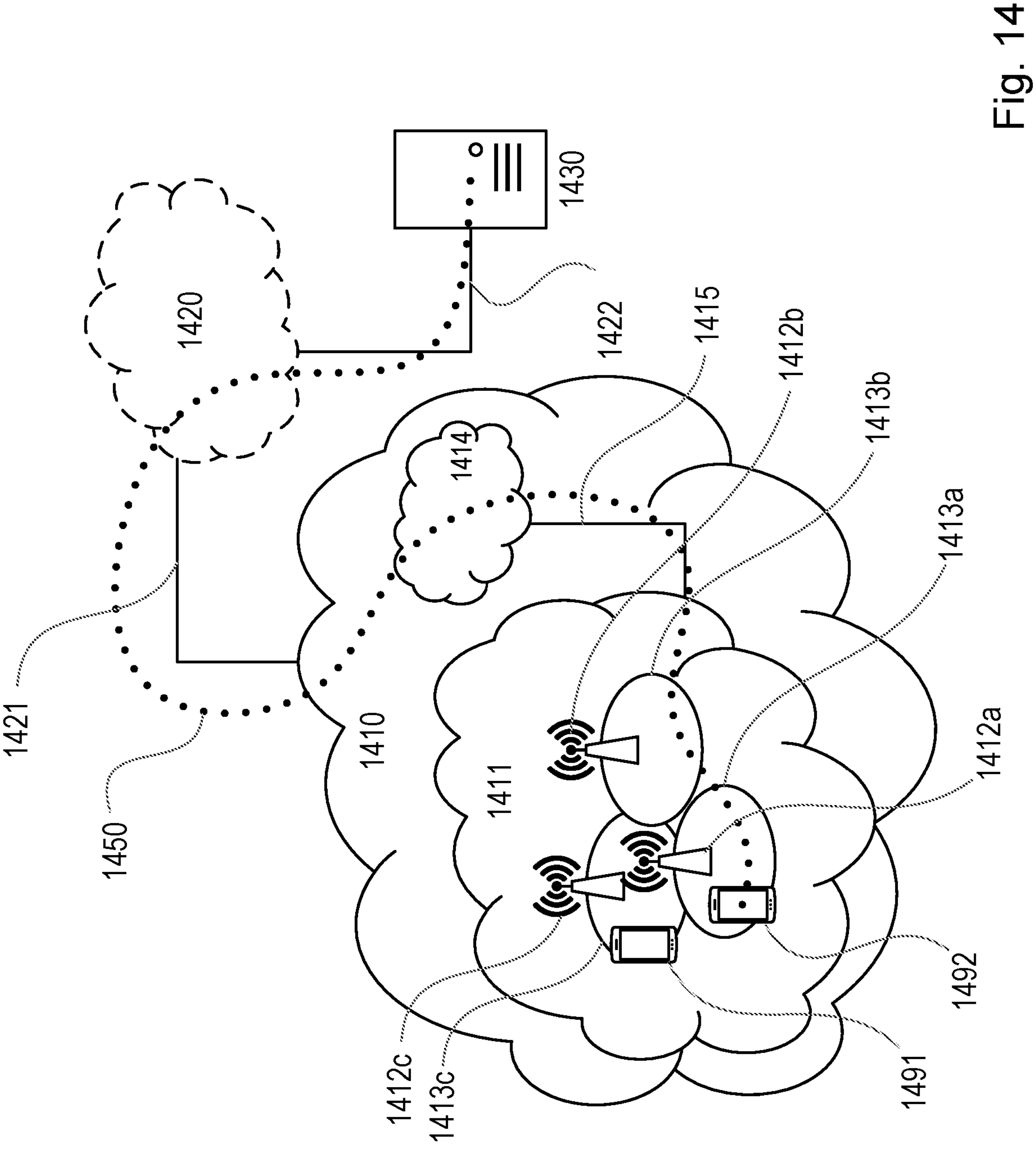
FIG. 14 schematically illustrates a telecommunication network connected via an intermediate network to a host computer in accordance with some embodiments.

With reference to FIG. 14, in accordance with an embodiment, a communication system includes telecommunication network 1410, such as a 3GPP-type cellular network, which comprises access network 1411, such as a radio access network, and core network 1414. Access network 1411 comprises a plurality of base stations **1412*a*, 1412*b*, 1412*c*, such as NBs, eNBs, gNBs or other types of wireless access points, each defining a corresponding coverage area 1413*a*, 1413*b*, 1413*c*. Each base station 1412*a*, 1412*b*, 1412*c* is connectable to core network 1414 over a wired or wireless connection 1415. A first UE 1491 located in coverage area 1413*c* is configured to wirelessly connect to, or be paged by, the corresponding base station 1412*c*. A second UE 1492 in coverage area 1413*a* is wirelessly connectable to the corresponding base station 1412*a*. While a plurality of UEs 1491, 1492 are illustrated in this example, the disclosed embodiments are equally applicable to a situation where a sole UE is in the coverage area or where a sole UE is connecting to the corresponding base station 1412**.

Telecommunication network 1410 is itself connected to host computer 1430, which may be embodied in the hardware and/or software of a standalone server, a cloud-implemented server, a distributed server or as processing resources in a server farm. Host computer 1430 may be under the ownership or control of a service provider, or may be operated by the service provider or on behalf of the service provider. Connections 1421 and 1422 between telecommunication network 1410 and host computer 1430 may extend directly from core network 1414 to host computer 1430 or may go via an optional intermediate network 1420. Intermediate network 1420 may be one of, or a combination of more than one of, a public, private or hosted network; intermediate network 1420, if any, may be a backbone network or the Internet; in particular, intermediate network 1420 may comprise two or more sub-networks (not shown).

The communication system of FIG. 14 as a whole enables connectivity between the connected UEs 1491, 1492 and host computer 1430. The connectivity may be described as an over-the-top (OTT) connection 1450. Host computer 1430 and the connected UEs 1491, 1492 are configured to communicate data and/or signaling via OTT connection 1450, using access network 1411, core network 1414, any intermediate network 1420 and possible further infrastructure (not shown) as intermediaries. OTT connection 1450 may be transparent in the sense that the participating communication devices through which OTT connection 1450 passes are unaware of routing of uplink and downlink communications. For example, base station 1412 may not or need not be informed about the past routing of an incoming downlink communication with data originating from host computer 1430 to be forwarded (e.g., handed over) to a connected UE 1491. Similarly, base station 1412 need not be aware of the future routing of an outgoing uplink communication originating from the UE 1491 towards the host computer 1430.

Example implementations, in accordance with an embodiment, of the UE, base station and host computer discussed in the preceding paragraphs will now be described with reference to FIG. 15. In communication system 1500, host computer 1510 comprises hardware 1515 including communication interface 1516 configured to set up and maintain a wired or wireless connection with an interface of a different communication device of communication system 1500. Host computer 1510 further comprises processing circuitry 1518, which may have storage and/or processing capabilities. In particular, processing circuitry 1518 may comprise one or more programmable processors, application-specific integrated circuits, field programmable gate arrays or combinations of these (not shown) adapted to execute instructions. Host computer 1510 further comprises software 1511, which is stored in or accessible by host computer 1510 and executable by processing circuitry 1518. Software 1511 includes host application 1512. Host application 1512 may be operable to provide a service to a remote user, such as UE 1530 connecting via OTT connection 1550 terminating at UE 1530 and host computer 1510. In providing the service to the remote user, host application 1512 may provide user data which is transmitted using OTT connection 1550.

Communication system 1500 further includes base station 1520 provided in a telecommunication system and comprising hardware 1525 enabling it to communicate with host computer 1510 and with UE 1530. Hardware 1525 may include communication interface 1526 for setting up and maintaining a wired or wireless connection with an interface of a different communication device of communication system 1500, as well as radio interface 1527 for setting up and maintaining at least wireless connection 1570 with UE 1530 located in a coverage area (not shown in FIG. 15) served by base station 1520. Communication interface 1526 may be configured to facilitate connection 1560 to host computer 1510. Connection 1560 may be direct or it may pass through a core network (not shown in FIG. 15) of the telecommunication system and/or through one or more intermediate networks outside the telecommunication system. In the embodiment shown, hardware 1525 of base station 1520 further includes processing circuitry 1528, which may comprise one or more programmable processors, application-specific integrated circuits, field programmable gate arrays or combinations of these (not shown) adapted to execute instructions. Base station 1520 further has software 1521 stored internally or accessible via an external connection.

Communication system 1500 further includes UE 1530 already referred to. Its hardware 1535 may include radio interface 1537 configured to set up and maintain wireless connection 1570 with a base station serving a coverage area in which UE 1530 is currently located. Hardware 1535 of UE 1530 further includes processing circuitry 1538, which may comprise one or more programmable processors, application-specific integrated circuits, field programmable gate arrays or combinations of these (not shown) adapted to execute instructions. UE 1530 further comprises software 1531, which is stored in or accessible by UE 1530 and executable by processing circuitry 1538. Software 1531 includes client application 1532. Client application 1532 may be operable to provide a service to a human or non-human user via UE 1530, with the support of host computer 1510. In host computer 1510, an executing host application 1512 may communicate with the executing client application 1532 via OTT connection 1550 terminating at UE 1530 and host computer 1510. In providing the service to the user, client application 1532 may receive request data from host application 1512 and provide user data in response to the request data. OTT connection 1550 may transfer both the request data and the user data. Client application 1532 may interact with the user to generate the user data that it provides.

Figure 15:
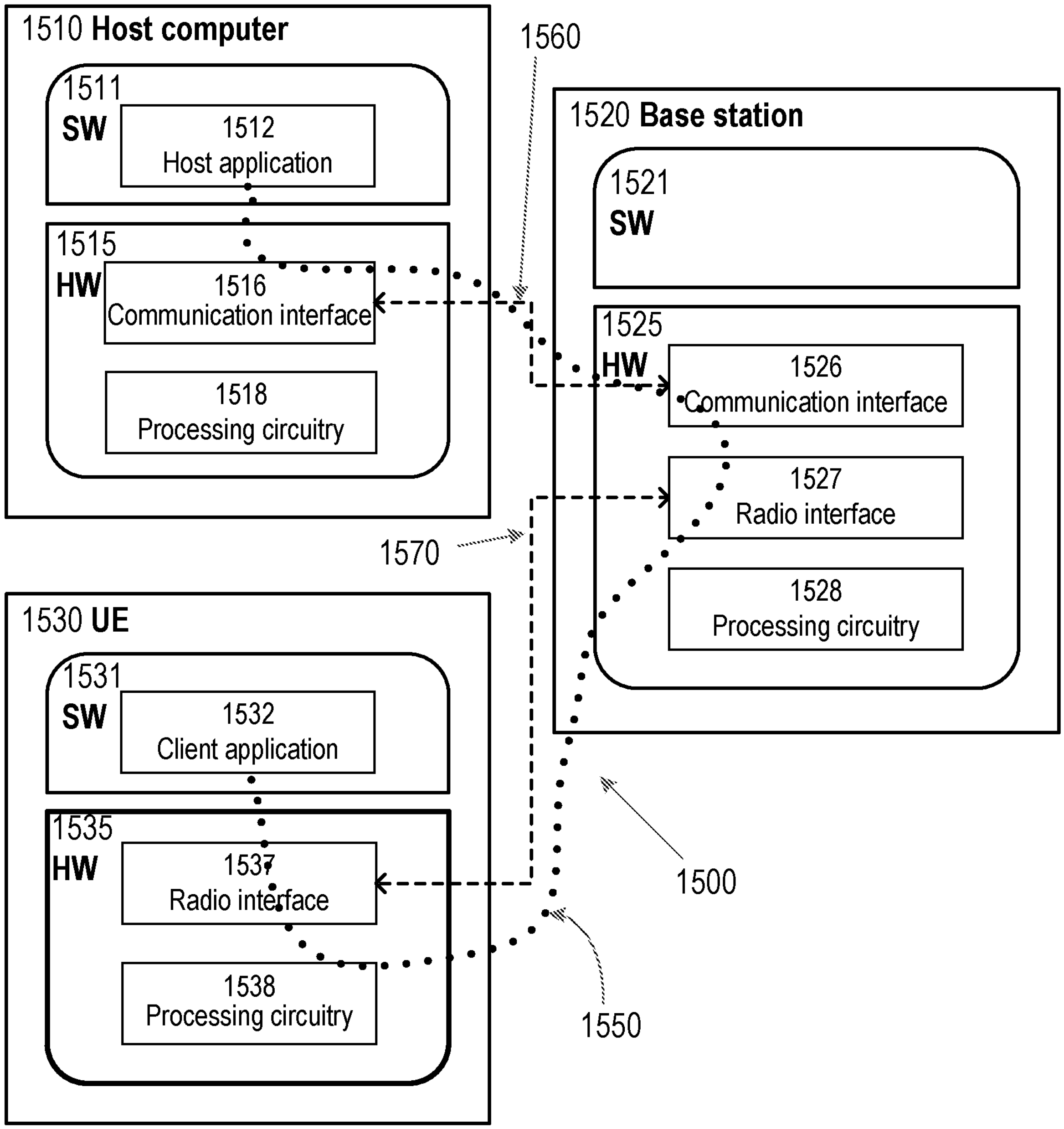
FIG. 15 schematically illustrates a host computer communicating via a base station with a user equipment over a partially wireless connection in accordance with some embodiments.

It is noted that host computer 1510, base station 1520 and UE 1530 illustrated in FIG. 15 may be similar or identical to host computer 1430, one of base stations 1412*a*, 1412*b*, 1412*c* and one of UEs 1491, 1492 of FIG. 14, respectively. This is to say, the inner workings of these entities may be as shown in FIG. 15 and independently, the surrounding network topology may be that of FIG. 14.

In FIG. 15, OTT connection 1550 has been drawn abstractly to illustrate the communication between host computer 1510 and UE 1530 via base station 1520, without explicit reference to any intermediary devices and the precise routing of messages via these devices. Network infrastructure may determine the routing, which it may be configured to hide from UE 1530 or from the service provider operating host computer 1510, or both. While OTT connection 1550 is active, the network infrastructure may further take decisions by which it dynamically changes the routing (e.g., on the basis of load balancing consideration or reconfiguration of the network).

Wireless connection 1570 between UE 1530 and base station 1520 is in accordance with the teachings of the embodiments described throughout this disclosure. One or more of the various embodiments improve the performance of OTT services provided to UE 1530 using OTT connection 1550, in which wireless connection 1570 forms the last segment. More precisely, the teachings of these embodiments may improve the efficiency of memory usage in the wireless device and thereby provide benefits such as faster processing and better responsiveness at the wireless device. The teachings of these embodiments may also improve the collection of QoE information in the network, and thereby enable operators to structure the network so as to better provide OTT services.

A measurement procedure may be provided for the purpose of monitoring data rate, latency and other factors on which the one or more embodiments improve. There may further be an optional network functionality for reconfiguring OTT connection 1550 between host computer 1510 and UE 1530, in response to variations in the measurement results. The measurement procedure and/or the network functionality for reconfiguring OTT connection 1550 may be implemented in software 1511 and hardware 1515 of host computer 1510 or in software 1531 and hardware 1535 of UE 1530, or both. In embodiments, sensors (not shown) may be deployed in or in association with communication devices through which OTT connection 1550 passes; the sensors may participate in the measurement procedure by supplying values of the monitored quantities exemplified above, or supplying values of other physical quantities from which software 1511, 1531 may compute or estimate the monitored quantities. The reconfiguring of OTT connection 1550 may include message format, retransmission settings, preferred routing etc.; the reconfiguring need not affect base station 1520, and it may be unknown or imperceptible to base station 1520. Such procedures and functionalities may be known and practiced in the art. In certain embodiments, measurements may involve proprietary UE signaling facilitating host computer 1510's measurements of throughput, propagation times, latency and the like. The measurements may be implemented in that software 1511 and 1531 causes messages to be transmitted, in particular empty or 'dummy' messages, using OTT connection 1550 while it monitors propagation times, errors etc.

Figure 16:
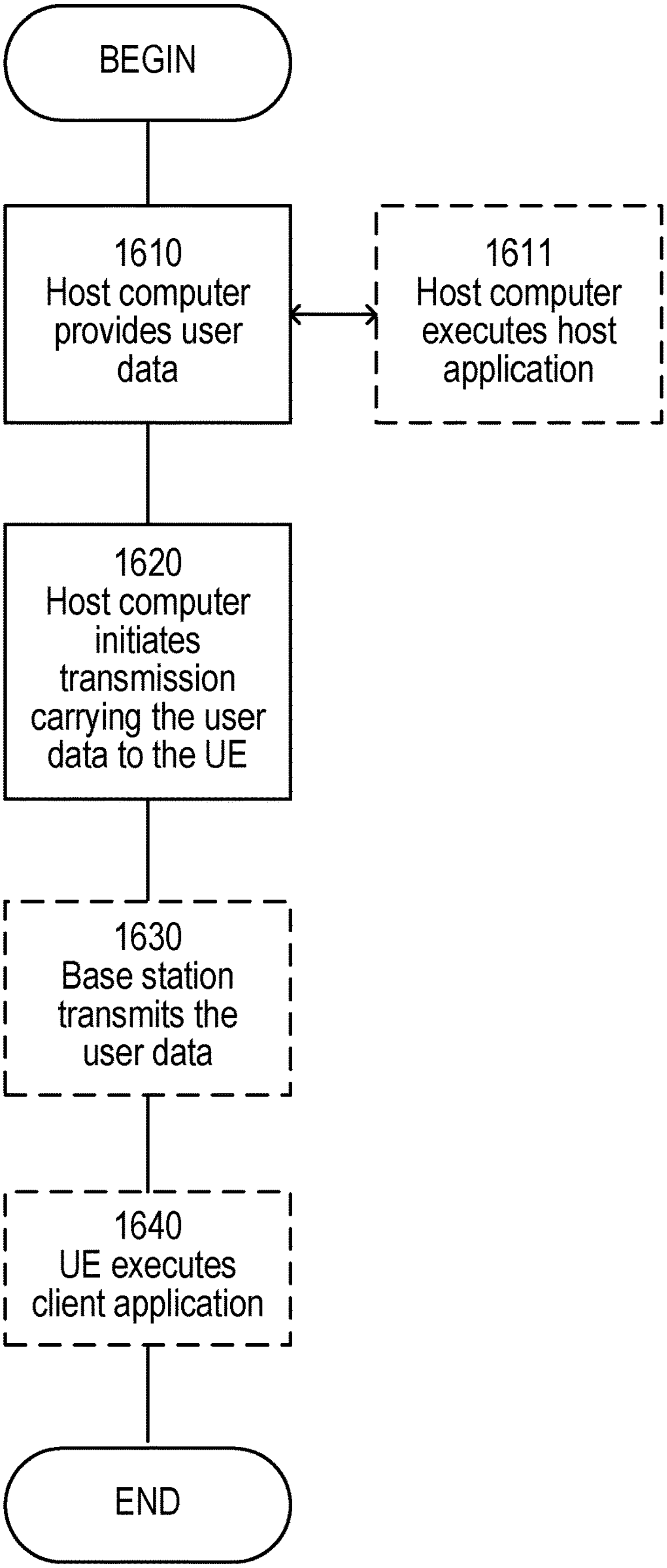
FIGS. 16-19 are flowcharts illustrating methods implemented in a communication system including a host computer, a base station and a user equipment in accordance with some embodiments.

FIG. 16 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 16 will be included in this section. In step 1610, the host computer provides user data. In substep 1611 (which may be optional) of step 1610, the host computer provides the user data by executing a host application. In step 1620, the host computer initiates a transmission carrying the user data to the UE. In step 1630 (which may be optional), the base station transmits to the UE the user data which was carried in the transmission that the host computer initiated, in accordance with the teachings of the embodiments described throughout this disclosure. In step 1640 (which may also be optional), the UE executes a client application associated with the host application executed by the host computer.

Figure 17:
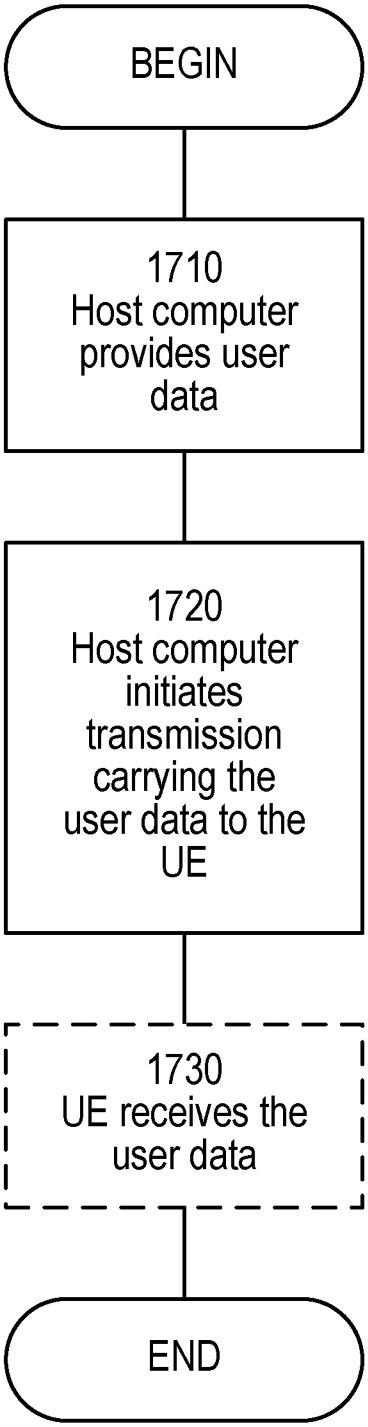

FIG. 17 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 17 will be included in this section. In step 1710 of the method, the host computer provides user data. In an optional substep (not shown) the host computer provides the user data by executing a host application. In step 1720, the host computer initiates a transmission carrying the user data to the UE. The transmission may pass via the base station, in accordance with the teachings of the embodiments described throughout this disclosure. In step 1730 (which may be optional), the UE receives the user data carried in the transmission.

Figure 18:
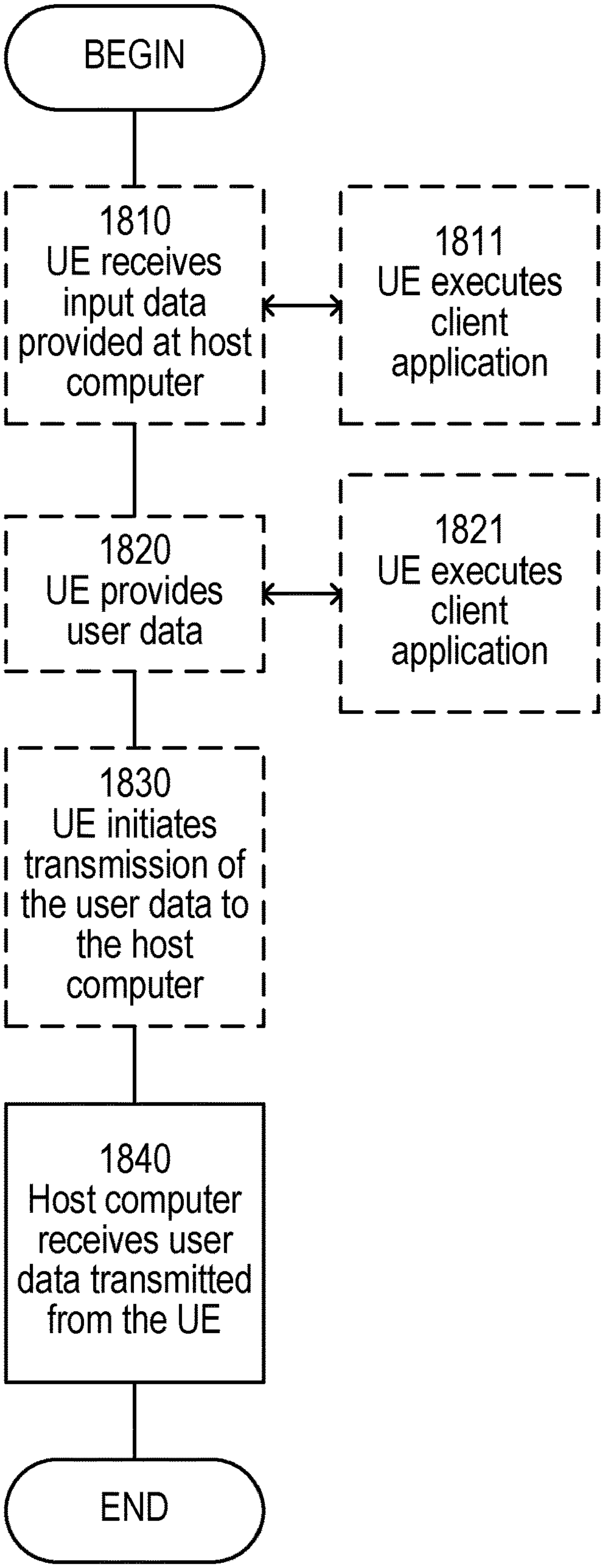

FIG. 18 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 18 will be included in this section. In step 1810 (which may be optional), the UE receives input data provided by the host computer. Additionally or alternatively, in step 1820, the UE provides user data. In substep 1821 (which may be optional) of step 1820, the UE provides the user data by executing a client application. In substep 1811 (which may be optional) of step 1810, the UE executes a client application which provides the user data in reaction to the received input data provided by the host computer. In providing the user data, the executed client application may further consider user input received from the user. Regardless of the specific manner in which the user data was provided, the UE initiates, in substep 1830 (which may be optional), transmission of the user data to the host computer. In step 1840 of the method, the host computer receives the user data transmitted from the UE, in accordance with the teachings of the embodiments described throughout this disclosure.

Figure 19:
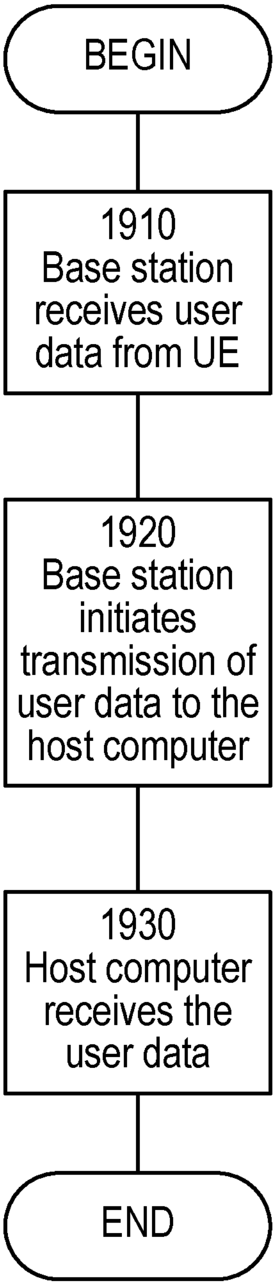

FIG. 19 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 19 will be included in this section. In step 1910 (which may be optional), in accordance with the teachings of the embodiments described throughout this disclosure, the base station receives user data from the UE. In step 1920 (which may be optional), the base station initiates transmission of the received user data to the host computer. In step 1930 (which may be optional), the host computer receives the user data carried in the transmission initiated by the base station.

Figure 20:
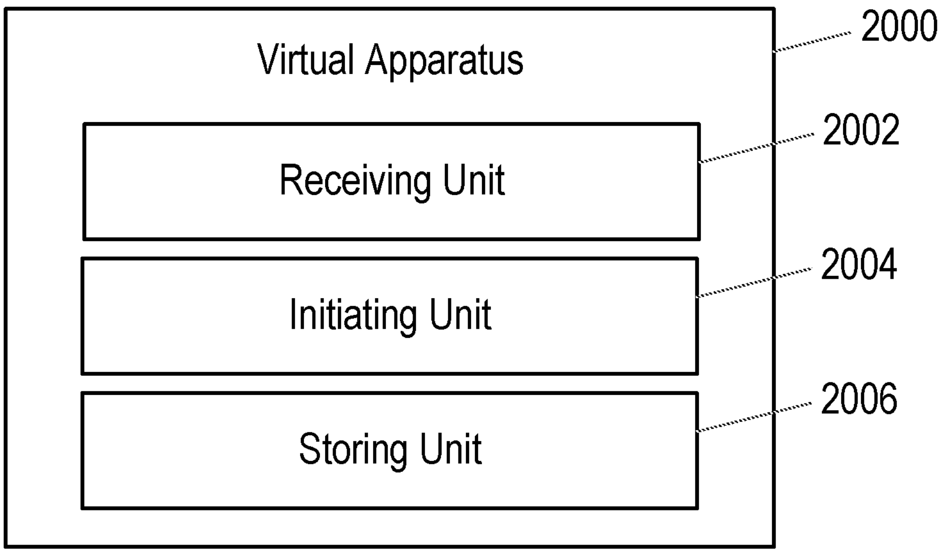
FIGS. 20 and 21 schematically illustrate virtualization apparatus in accordance with some embodiments.

FIG. 20 illustrates a schematic block diagram of an apparatus 2000 in a wireless network (for example, the wireless network shown in FIG. 11). The apparatus may be implemented in a wireless device pr UE (e.g., wireless device 1110 shown in FIG. 11 or UE 1200 shown in FIG. 12). Apparatus 2000 is operable to carry out the example method described with reference to FIG. 9 and possibly any other processes or methods disclosed herein. It is also to be understood that the method of FIG. 9 is not necessarily carried out solely by apparatus 2000. At least some operations of the method can be performed by one or more other entities.

Virtual Apparatus 2000 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving unit 2002, initiating unit 2004 and storing unit 2006, and any other suitable units of apparatus 2000 to perform corresponding functions according one or more embodiments of the present disclosure.

The apparatus 2000 comprises a storage medium. As illustrated in FIG. 20, apparatus 2000 includes receiving unit 2002, initiating unit 2004 and storing unit 2006. Receiving unit 2002 is configured to receive, from a base station, a request to perform one or more QoE measurements according to a QoE measurement configuration. Initiating unit 2004 is configured to initiate one or more QoE measurements according to the QoE measurement configuration. Storing unit 2006 is configured to store results of the one or more QoE measurements in a storage portion of the storage medium allocated for the storage of QoE measurements. The storage portion has a configured maximum size.

Figure 21:
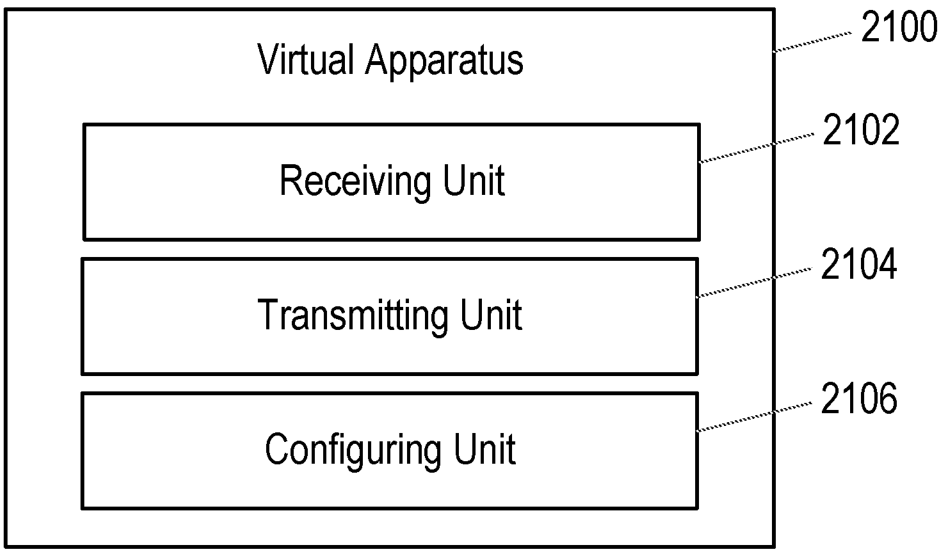

FIG. 21 illustrates a schematic block diagram of an apparatus 2100 in a wireless network (for example, the wireless network shown in FIG. 11). The apparatus may be implemented in a base station or network node (e.g., network node 1160 shown in FIG. 11). Apparatus 1000 is operable to carry out the example method described with reference to FIG. 10 and possibly any other processes or methods disclosed herein. It is also to be understood that the method of FIG. 10 is not necessarily carried out solely by apparatus 2100. At least some operations of the method can be performed by one or more other entities.

Virtual Apparatus 2100 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving unit 2102, transmitting unit 2104 and configuring unit 2106, and any other suitable units of apparatus 2100 to perform corresponding functions according one or more embodiments of the present disclosure.

The apparatus 2100 is configured to control the handling of QoE data in a wireless device. The wireless device comprises a storage medium having a storage portion allocated for the storage of QoE measurements.

As illustrated in FIG. 21, apparatus 2100 includes receiving unit 2102, transmitting unit 2104 and configuring unit 2106. In one embodiment, receiving unit 2102 is configured to receive, from the wireless device, an indication of a configured maximum size of the storage portion. Transmitting unit 2104 is configured to transmit, to the wireless device, a request for the wireless device to perform one or more QoE measurements according to a QoE measurement configuration. In this embodiment, the QoE measurement configuration may be adapted based on the indicated configured maximum size of the storage portion. In this embodiment, apparatus 2100 may not comprise configuring unit 2106.

In another embodiment, transmitting unit 2104 is configured to transmit, to the wireless device, a request for the wireless device to perform one or more QoE measurements according to a QoE measurement configuration. Configuring unit 2106 is configured to configure the wireless device with a configured maximum size of the storage portion. In this embodiment, apparatus 2100 may not comprise receiving unit 2102.

The term "unit" may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

For the avoidance of doubt, the following statements set out embodiments of the disclosure.

Group A Embodiments

1. A method performed by a wireless device for handling quality-of-experience, QoE, data, wherein the wireless device comprises a storage medium, the method comprising:
   - receiving, from a base station, a request to perform one or more measurements according to a QoE measurement configuration;
   - initiating one or more QoE measurements according to the QoE measurement configuration; and
   - storing results of the one or more QoE measurements in a storage portion of the storage medium allocated for the storage of QoE measurements,
   - wherein the storage portion has a configured maximum size.
2. The method of embodiment 1, wherein the configured maximum size is hard-coded in the wireless device.
3. The method of embodiment 1, wherein configured maximum size can take one of a plurality of possible values.
4. The method of any one of the preceding embodiments, further comprising transmitting an indication of the configured maximum size to the base station.
5. The method of embodiment 4, wherein the indication of the configured maximum size is transmitted in a message indicating the capabilities of the wireless device.
6. The method of embodiment 4 or 5 as dependent on embodiment 2, wherein the indication of the configured maximum size comprises an indication that the wireless device is capable of storing results of the one or more QoE measurements in the storage portion up to at least the hard-coded configured maximum size.
7. The method according to embodiment 1, wherein the configured maximum size is configured by the base station, and further comprising receiving an indication of the configured maximum size from the base station.
8. The method according to embodiment 7, wherein the indication of the configured maximum size is received with the request to perform one or more measurements according to the QoE measurement configuration.
9. The method according to any one of the preceding embodiments, wherein the storage portion has configured maximum sizes for multiple radio-access technologies, RATs.
10. The method according to any one of the preceding embodiments, wherein the storage portion has configured maximum sizes for multiple service types or sub-service types.
11. The method according to any one of the preceding embodiments, wherein the storage portion has configured maximum sizes based on the network slices, targeted for the QoE measurements.
12. The method according to any one of the preceding embodiments, wherein the storage portion has respective configured maximum sizes for legacy QoE reports and lightweight QoE reports.
13. The method according to any one of the preceding embodiments, wherein the configured maximum size relates to storage of a defined number of QoE reports.
14. The method according to any one of the preceding embodiments, wherein the configured maximum size is a first configured maximum size applicable when the QoE measurement configuration is associated with a first priority value.
15. The method according to embodiment 14, wherein a second configured maximum size, greater than the first configured maximum size, is applicable when the QoE measurement configuration is associated with a second priority value, higher than the first priority value.
16. The method according to embodiment 15, wherein the second configured maximum size is applicable only while a timer associated with second priority value is running.
17. The method according to any one of the preceding embodiments, further comprising, responsive to a determination that the storage portion is full to the configured maximum size, transmitting stored results of the one or more QoE measurements to the base station, stopping further QoE measurements and deleting the QoE measurement configuration.
18. The method according to any one of embodiments 1 to 16, further comprising, responsive to a determination that the storage portion is full to the configured maximum size, pausing further QoE measurements according to the QoE measurement configuration.
19. The method according to any one of embodiments 1 to 16 and 18, further comprising, responsive to a determination that the storage portion is full to the configured maximum size, transmitting stored results of the one or more QoE measurements to the base station.
20. The method according to embodiment 19, further comprising, after transmission of the stored results, continuing to initiate QoE measurements according to the QoE measurement configuration.
21. The method according to any one of embodiments 1 to 16 and 18, further comprising, responsive to a determination that it is not possible to transmit the stored results, continuing to store the results of the one or more QoE measurements until it is possible to transmit the results and/or the storage portion is full to the configured maximum size.
22. The method according to any one of embodiments 1 to 16 and 18, further comprising, responsive to a determination that it is not possible to transmit the stored results, continuing to store only a fraction of the results of the one or more QoE measurements until it is possible to transmit the results to the base station.

23. The method according to any one of embodiments 1 to 16 and 18, further comprising, responsive to a determination that it is not possible to transmit the stored results, storing only statistical data relating to the results of the one or more QoE measurements.
24. The method according to embodiment 23, wherein the statistical data comprises one or more average values for the results of the QoE measurements.
25. The method according to any one of embodiments 1 to 16 and 18, further comprising, responsive to a determination that it is not possible to transmit the stored results, deleting one or more results of the QoE measurements based on relative priority values associated with the QoE measurements.
26. The method according to any one of the preceding embodiments, further comprising, responsive to a determination that the storage portion is full to a threshold value less than the configured maximum size, transmitting an information message to the base station comprising an indication that the storage portion is full to the threshold value.
27. The method of any of the previous embodiments, further comprising:
    providing user data; and
    forwarding the user data to a host computer via the transmission to the base station.

Group B Embodiments

28. A method performed by a base station for controlling the handling of quality-of-experience, QoE, data in a wireless device, the wireless device comprising a storage medium having a storage portion allocated for the storage of QoE measurements, the method comprising:
    receiving, from the wireless device, an indication of a configured maximum size of the storage portion; and
    transmitting, to the wireless device, a request for the wireless device to perform one or more measurements according to a QoE measurement configuration.
29. A method performed by a base station for controlling the handling of quality-of-experience, QoE, data in a wireless device, the wireless device comprising a storage medium having a storage portion allocated for the storage of QoE measurements, the method comprising:
    transmitting, to the wireless device, a request for the wireless device to perform one or more measurements according to a QoE measurement configuration; and
    configuring the wireless device with a configured maximum size of the storage portion.
30. The method of embodiment 29, wherein the step of configuring the wireless device with a configured maximum size of the storage portion comprises transmitting an indication of the configured maximum size of the storage portion in the QoE measurement configuration.
31. The method according to any one of embodiments 29 to 30, wherein the wireless device is configured with configured maximum sizes for multiple radio-access technologies, RATs.
32. The method according to any one of embodiments 29 to 31, wherein the wireless device is configured with configured maximum sizes for multiple service types or sub-service types.
33. The method according to any one of embodiments 29 to 32, wherein the wireless device is configured with configured maximum sizes based on the network slices, targeted for the QoE measurements.
34. The method according to any one of embodiments 29 to 33, wherein the wireless device is configured with configured maximum sizes for legacy QoE reports and lightweight QoE reports.
35. The method according to any one of embodiments 29 to 34, wherein the configured maximum size relates to storage of a defined number of QoE reports.
36. The method according to any one of embodiments 29 to 35, wherein the configured maximum size is a first configured maximum size applicable when the QoE measurement configuration is associated with a first priority value.
37. The method according to embodiment 36, wherein a second configured maximum size, greater than the first configured maximum size, is applicable when the QoE measurement configuration is associated with a second priority value, higher than the first priority value.
38. The method according to embodiment 37, wherein the second configured maximum size is applicable only while a timer associated with second priority value is running.
39. The method according to any one of embodiments 28 to 38, further comprising configuring the wireless device with one or more actions to take, responsive to a determination that the storage portion is full to the configured maximum size.
40. The method according to embodiment 39, wherein the one or more actions comprise one or more of: transmitting stored results of the QoE measurements to the base station; storing stored results of the QoE measurements until it is possible to transmit the stored results of the QoE measurements to the base station.
41. The method according to embodiment 39 or 40, wherein the one or more actions comprise one or more of: pausing initiating further QoE measurements according to the QoE measurement configuration; stopping initiating further QoE measurements according to the QoE measurement configuration and deleting the QoE measurement configuration; continuing to initiate further QoE measurements according to the QoE measurement configuration after transmission of stored results of the QoE measurements.
42. The method according to any one of embodiments 28 to 41, further comprising receiving, from the wireless device, an information message comprising an indication that the storage portion is full to a threshold value less than the configured maximum size.
43. The method according to embodiment 42, further comprising configuring the wireless device with the threshold value.
44. The method of any of the previous embodiments, further comprising:
    obtaining user data; and
    forwarding the user data to a host computer or a wireless device.

Group C Embodiments

45. A wireless device, the wireless device comprising:
    processing circuitry configured to cause the wireless device to perform any of the steps of any of the Group A embodiments; and power supply circuitry configured to supply power to the wireless device.

46. A base station, the base station comprising:

processing circuitry configured to cause the base station to perform any of the steps of any of the Group B embodiments;

power supply circuitry configured to supply power to the base station.

47. A user equipment (UE), the UE comprising:

an antenna configured to send and receive wireless signals;

radio front-end circuitry connected to the antenna and to processing circuitry, and configured to condition signals communicated between the antenna and the processing circuitry;

the processing circuitry being configured to cause the UE to perform any of the steps of any of the Group A embodiments;

an input interface connected to the processing circuitry and configured to allow input of information into the UE to be processed by the processing circuitry;

an output interface connected to the processing circuitry and configured to output information from the UE that has been processed by the processing circuitry; and a battery connected to the processing circuitry and configured to supply power to the UE.

48. A communication system including a host computer comprising:

processing circuitry configured to provide user data; and a communication interface configured to forward the user data to a cellular network for transmission to a user equipment (UE), wherein the cellular network comprises a base station having a radio interface and processing circuitry, the base station's processing circuitry configured to cause the base station to perform any of the steps of any of the Group B embodiments.

49. The communication system of the previous embodiment further including the base station.

50. The communication system of the previous 2 embodiments, further including the UE, wherein the UE is configured to communicate with the base station.

51. The communication system of the previous 3 embodiments, wherein:

the processing circuitry of the host computer is configured to execute a host application, thereby providing the user data; and the UE comprises processing circuitry configured to execute a client application associated with the host application.

52. A method implemented in a communication system including a host computer, a base station and a user equipment (UE), the method comprising:

at the host computer, providing user data; and at the host computer, initiating a transmission carrying the user data to the UE via a cellular network comprising the base station, wherein the base station performs any of the steps of any of the Group B embodiments.

53. The method of the previous embodiment, further comprising, at the base station, transmitting the user data.

54. The method of the previous 2 embodiments, wherein the user data is provided at the host computer by executing a host application, the method further comprising, at the UE, executing a client application associated with the host application.

55. A user equipment (UE) configured to communicate with a base station, the UE comprising a radio interface and processing circuitry configured to cause the UE to perform any of the previous 3 embodiments.

56. A communication system including a host computer comprising:

processing circuitry configured to provide user data; and a communication interface configured to forward user data to a cellular network for transmission to a user equipment (UE), wherein the UE comprises a radio interface and processing circuitry, the UE's components configured to cause the UE to perform any of the steps of any of the Group A embodiments.

57. The communication system of the previous embodiment, wherein the cellular network further includes a base station configured to communicate with the UE.

58. The communication system of the previous 2 embodiments, wherein:

the processing circuitry of the host computer is configured to execute a host application, thereby providing the user data; and the UE's processing circuitry is configured to execute a client application associated with the host application.

59. A method implemented in a communication system including a host computer, a base station and a user equipment (UE), the method comprising:

at the host computer, providing user data; and at the host computer, initiating a transmission carrying the user data to the UE via a cellular network comprising the base station, wherein the UE performs any of the steps of any of the Group A embodiments.

60. The method of the previous embodiment, further comprising at the UE, receiving the user data from the base station.

61. A communication system including a host computer comprising:

communication interface configured to receive user data originating from a transmission from a user equipment (UE) to a base station, wherein the UE comprises a radio interface and processing circuitry, the UE's processing circuitry configured to cause the UE to perform any of the steps of any of the Group A embodiments.

62. The communication system of the previous embodiment, further including the UE.

63. The communication system of the previous 2 embodiments, further including the base station, wherein the base station comprises a radio interface configured to communicate with the UE and a communication interface configured to forward to the host computer the user data carried by a transmission from the UE to the base station.

64. The communication system of the previous 3 embodiments, wherein:

the processing circuitry of the host computer is configured to execute a host application; and the UE's processing circuitry is configured to execute a client application associated with the host application, thereby providing the user data.

65. The communication system of the previous 4 embodiments, wherein:
   the processing circuitry of the host computer is configured to execute a host application, thereby providing request data; and
   the UE's processing circuitry is configured to execute a client application associated with the host application, thereby providing the user data in response to the request data.
66. A method implemented in a communication system including a host computer, a base station and a user equipment (UE), the method comprising:
   at the host computer, receiving user data transmitted to the base station from the UE, wherein the UE performs any of the steps of any of the Group A embodiments.
67. The method of the previous embodiment, further comprising, at the UE, providing the user data to the base station.
68. The method of the previous 2 embodiments, further comprising:
   at the UE, executing a client application, thereby providing the user data to be transmitted; and
   at the host computer, executing a host application associated with the client application.
69. The method of the previous 3 embodiments, further comprising:
   at the UE, executing a client application; and
   at the UE, receiving input data to the client application, the input data being provided at the host computer by executing a host application associated with the client application,
   wherein the user data to be transmitted is provided by the client application in response to the input data.
70. A communication system including a host computer comprising a communication interface configured to receive user data originating from a transmission from a user equipment (UE) to a base station, wherein the base station comprises a radio interface and processing circuitry, the base station's processing circuitry configured to cause the base station to perform any of the steps of any of the Group B embodiments.
71. The communication system of the previous embodiment further including the base station.
72. The communication system of the previous 2 embodiments, further including the UE, wherein the UE is configured to communicate with the base station.
73. The communication system of the previous 3 embodiments, wherein:
   the processing circuitry of the host computer is configured to execute a host application;
   the UE is configured to execute a client application associated with the host application, thereby providing the user data to be received by the host computer.
74. A method implemented in a communication system including a host computer, a base station and a user equipment (UE), the method comprising:
   at the host computer, receiving, from the base station, user data originating from a transmission which the base station has received from the UE, wherein the UE performs any of the steps of any of the Group A embodiments.
75. The method of the previous embodiment, further comprising at the base station, receiving the user data from the UE.

76. The method of the previous 2 embodiments, further comprising at the base station, initiating a transmission of the received user data to the host computer.

Abbreviations

At least some of the following abbreviations may be used in this disclosure. If there is an inconsistency between abbreviations, preference should be given to how it is used above. If listed multiple times below, the first listing should be preferred over any subsequent listing(s).

3GPP 3 rd Generation Partnership Project
5G 5th Generation
5GC 5G Core
5GS 5G System
AMF Access and Mobility management Function
AR Augmented Reality
AT Attention
BAP Backhaul Adaptation Protocol Layer
CN Core Network
CP Control Plane
CU Central Unit
DL Downlink
DRB Data Radio Bearer
DU Distributed Unit
E1 The interface between gNB-CU-CP and gNB-CU-UP.
eNB Evolved NodeB (A radio base station in LTE/E-UTRAN.)
EN-DC E-UTRAN-NR Dual Connectivity
EPS Evolved Packet System
E-UTRAN Evolved UTRAN
F1 The interface between gNB-CU and gNB-DU.
F1-C The control plane part of F1.
F1-U The user plane part of F1.
FDD Frequency Division Duplex
gNB Radio base station in NR.
IAB Integrated Access and Backhaul
ID Identity/Identifier
LTE Long Term Evolution
MDT Minimization of Drive Tests
NG Next Generation
NG The interface between the RAN and the CN in 5GS.
NG-RAN Next Generation RAN (i.e. 5G RAN)
NR New Radio
OAM/O&M Operation and Maintenance
PDCP Packet Data Convergence Protocol
QoE Quality of Experience
QoS Quality of Service
RAN Radio Access Network
RAT Radio Access Technology
RNL Radio Network Layer
RRC Radio Resource Control
S1 The interface between the RAN and the CN in EPS.
S1-C The control plane part of S1.
S1-U The user plane part of S1.
S1AP S1 Application Protocol
SCell Secondary Cell
SFN System Frame Number
TCE Trace Collector Entity
TCP Transmission Control Protocol
TDD Time Division Duplex
TNL Transport Network Layer
TS Technical Specification
UE User Equipment
UL Uplink
UMTS Universal Mobile Telecommunication System
UP User Plane URLLC Ultra-Reliable Ultra-Low Communication
UTC Coordinated Universal Time
UTRAN Universal Terrestrial Radio Access Network
VR Virtual Reality
X2 The interface between two eNBs in LTE.
X2-C The control plane part of X2.
X2-U The user plane part of X2.
Xn The interface between two gNBs in NR.
Xn-C The control plane part of Xn.
Xn-U The user plane part of Xn.
1×RTT CDMA2000 1× Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network

The invention claimed is:

1. A method performed by a wireless device for handling quality-of-experience (QoE) data, the method comprising:

receiving, from a base station, a request to perform one or more QoE measurements according to a QoE measurement configuration;

initiating one or more ongoing QoE measurements according to the QoE measurement configuration;

storing, on an ongoing basis, QoE report data generated from the one or more ongoing QoE measurements in buffer reserved at a radio resource control (RRC) layer for QoE measurement reporting to the base station, the buffer having a configured maximum size that is less than a capacity of a storage medium in which the buffer is reserved; and transmitting an indication to the base station responsive to determining that the buffer is full to a configured threshold that is less than the configured maximum size.

2. The method of claim 1, wherein the configured maximum size is hard-coded in the wireless device.

3. The method of claim 1, wherein the configured maximum size is one of a plurality of possible values.

4. The method of claim 1, further comprising transmitting an indication of the configured maximum size to the base station.

5. The method of claim 4, wherein the indication of the configured maximum size is transmitted in a message indicating the capabilities of the wireless device.

6. The method of claim 4, wherein the indication of the configured maximum size comprises an indication that the wireless device is capable of buffering an amount of QoE report data equal to at least the hard-coded configured maximum size.

7. The method according to claim 1, wherein the configured maximum size is configured by the base station, and further comprising receiving an indication of the configured maximum size from the base station.

8. The method according to claim 7, wherein the indication of the configured maximum size is received with the request to perform one or more QoE measurements according to the QoE measurement configuration.

9. The method according to claim 1, wherein the buffer comprises multiple buffers reserved at the RRC layer, the multiple buffers having respective maximum configured sizes for at least one of:

multiple radio-access technologies (RATs);

multiple service types or sub-service types;

multiple network slices, targeted for the QoE measurements; and multiple QoE report types, including at least legacy QoE reports and lightweight QoE reports.

10. The method according to claim 1, wherein the configured maximum size relates to storage of a defined number of QoE reports.

11. The method according to claim 1, wherein the configured maximum size is a first configured maximum size applicable when the QoE measurement configuration is associated with a first priority value.

12. The method according to claim 11, wherein the configured maximum size is a second configured maximum size that is greater than the first configured maximum size and is applicable when the QoE measurement configuration is associated with a second priority value, higher than the first priority value.

13. The method according to claim 12, wherein the second configured maximum size is applicable only while a timer associated with the second priority value is running.

14. The method according to claim 1, further comprising, responsive to a determination that the buffer is full to the configured maximum size, transmitting the QoE report data to the base station, stopping further QoE measurements, and deleting the QoE measurement configuration.

15. The method according to claim 1, further comprising, responsive to a determination that the buffer is full to the configured maximum size, pausing further QoE measurements according to the QoE measurement configuration.

16. The method according to claim 1, further comprising, responsive to a determination that the buffer is full to the configured maximum size, transmitting the QoE report data and emptying the buffer to the base station.

17. The method according to claim 16, further comprising, after transmission of QoE report containing the QoE report data held in the buffer, storing newly generated QoE report data corresponding to the one or more ongoing QoE measurements, based on overwriting the buffer or emptying the buffer in association with transmission of the QoE report.

18. The method according to claim 1, wherein storing the QoE report data on an ongoing basis comprises storing QoE report data in the buffer until the buffer is full to the configured maximum size.

19. The method according to claim 1, further comprising, responsive to a determination that it is not possible to transmit a QoE measurement report to the base station, decimating measurement results collected by performance of the one or more ongoing QoE measurements, to reduce storage requirements for the QoE report data.

20. The method according to claim 1, further comprising, responsive to a determination that it is not possible to transmit a QoE measurement report to the base station, averaging measurement results collected by performance of the one or more ongoing QoE measurements, to reduce storage requirements for the QoE report data.

21. The method according to claim 1, further comprising, responsive to a determination that it is not possible to transmit a QoE measurement report to the base station, deleting one or more portions of the QoE report data, to reduce storage requirements for the QoE report data, the one or more deleted portions determined based on relative priority values associated with the corresponding ones of the one or more ongoing QoE measurements.

22. The method according to claim 1, wherein the configured maximum size is configured by the base station and wherein the method further comprises the wireless device receiving an indication of the maximum configured size from the base station.

23. A wireless device for handling quality-of-experience (QoE) data, the wireless device comprising:

a radio frequency transceiver;

processing circuitry configured to:

receive, via the radio frequency transceiver, a request from a base station to perform one or more QoE measurements according to a QoE measurement configuration;

initiate one or more ongoing QoE measurements according to the QoE measurement configuration;

store, on an ongoing basis, QoE report data generated from the one or more ongoing QoE measurements in a buffer reserved at a radio resource control (RRC) layer for QoE measurement reporting to the base station, the buffer having a configured maximum size that is less than a capacity of a storage medium in which the buffer is reserved; and transmit, via the radio frequency transceiver, an indication to the base station, the indication transmitted responsive to the wireless device determining that the buffer is full to a configured threshold that is less than the configured maximum size; and power supply circuitry configured to supply power to the wireless device.

* * * * *